United States Patent
Yan et al.

(10) Patent No.: US 11,582,806 B2
(45) Date of Patent: Feb. 14, 2023

(54) COMMUNICATION METHOD AND APPARATUS

(71) Applicant: Huawei Technologies Co., Ltd., Shenzhen (CN)

(72) Inventors: Mao Yan, Chengdu (CN); Huang Huang, Chengdu (CN); Hua Shao, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 61 days.

(21) Appl. No.: 16/875,717

(22) Filed: May 15, 2020

(65) Prior Publication Data
US 2020/0281026 A1    Sep. 3, 2020

Related U.S. Application Data

(63) Continuation of application No. PCT/CN2018/116262, filed on Nov. 19, 2018.

(30) Foreign Application Priority Data

Nov. 17, 2017  (CN) .......................... 201711149085.X

(51) Int. Cl.
*H04W 72/04*      (2009.01)
*H04W 74/08*      (2009.01)
*H04W 72/0453*    (2023.01)

(52) U.S. Cl.
CPC ..... *H04W 74/0833* (2013.01); *H04W 72/042* (2013.01); *H04W 72/0453* (2013.01)

(58) Field of Classification Search
CPC ........... H04W 72/0453; H04W 72/042; H04W 24/10; H04W 74/006; H04W 72/0406; H04W 72/0413
See application file for complete search history.

(56) References Cited

U.S. PATENT DOCUMENTS

2009/0203384 A1    8/2009  Vujcic
2015/0373697 A1   12/2015  Wang et al.
(Continued)

FOREIGN PATENT DOCUMENTS

CN    102752876 A    10/2012
CN    102811191 A    12/2012
(Continued)

OTHER PUBLICATIONS

3rd Generation Partnership Project; Technical Specification Group Radio Access Network; Evolved Universal Terrestrial Radio Access (E-UTRA); Physical channels and modulation (Release 13), 3GPP TS 36.211 V13.7.1 (Sep. 2017), 172 pages.
(Continued)

*Primary Examiner* — Chi Ho A Lee
(74) *Attorney, Agent, or Firm* — Slater Matsil, LLP

(57) ABSTRACT

This application discloses a communication method and apparatus. A terminal device determines a frequency position of a random access resource based on at least one of an initial frequency offset, a random access resource configuration period, an uplink channel bandwidth, a bandwidth of the random access resource, a time period of a random access resource, a time period of the random access resource, and a frequency index of the random access resource that are configured by a network device, and the terminal device sends a random access signal to the network device at the determined frequency position.

20 Claims, 10 Drawing Sheets

(56) References Cited

U.S. PATENT DOCUMENTS

| | | | |
|---|---|---|---|
| 2016/0183295 A1 | 6/2016 | Liu et al. | |
| 2017/0079070 A1 | 3/2017 | Lu | |
| 2017/0245308 A1 | 8/2017 | Morioka | |
| 2018/0077696 A1* | 3/2018 | Lee | H04W 72/048 |
| 2018/0255586 A1* | 9/2018 | Einhaus | H04W 52/00 |
| 2019/0075602 A1* | 3/2019 | Lin | H04W 72/0453 |
| 2020/0028636 A1* | 1/2020 | Tang | H04W 72/0406 |
| 2020/0067754 A1* | 2/2020 | Jung | H04W 24/10 |
| 2020/0128588 A1* | 4/2020 | Xiong | H04W 72/042 |
| 2020/0163032 A1* | 5/2020 | Su | H04W 48/12 |
| 2020/0252934 A1* | 8/2020 | Xue | H04W 72/042 |
| 2020/0351853 A1* | 11/2020 | Xiong | H04W 74/006 |
| 2020/0383089 A1* | 12/2020 | Goto | H04W 72/04 |
| 2021/0076389 A1* | 3/2021 | Zhang | H04W 72/0413 |
| 2021/0084653 A1* | 3/2021 | Li | H04W 72/0453 |

FOREIGN PATENT DOCUMENTS

| | | |
|---|---|---|
| CN | 103441979 A | 12/2013 |
| CN | 103796323 A | 5/2014 |
| CN | 104349476 A | 2/2015 |
| CN | 106538019 A | 3/2017 |
| CN | 109803446 A | 5/2019 |
| WO | 2009099312 A3 | 10/2009 |
| WO | 2017160222 A1 | 9/2017 |

OTHER PUBLICATIONS

3rd Generation Partnership Project Technical Specification Group Radio Access Network; NR; Physical layer procedures for control (Release 15), 3GPP TS 38.213 V1.0.0 (Sep. 2017), 16 pages.

3rd Generation Partnership Project; Technical Specification Group Radio Access Network; NR; Physical layer procedures for data (Release 15), 3GPP TS 38.214 V0.1.1 (Aug. 2017), 33 pages.

3rd Generation Partnership Project; Technical Specification Group Radio Access Network; NR; Radio Resource Control (RRC); Protocol specification (Release 15 ), 3GPP TS 38.331 V0.1.0 (Oct. 2017), 42 pages.

3rd Generation Partnership Project;Technical Specification Group Radio Access Network;NR;Physical channels and modulation (Release 15), 3GPP TS 38.211 V0.1.2 (Aug. 2017), 29 pages.

Qualcomm Inc., "Remaining Details on PRACH Formats", 3GPP TSG-RAN WG1 Meeting #90bis, R1-1718531, Prague, Oct. 9-13, 2017, 21 pages.

Huawei et al., "PRACH preamble sequences for NR", 3GPP TSG RAN WG1 Meeting #88bis, R1-1705055, Spokane, WA, USA, Apr. 3-7, 2017, 18 pages.

Huawei, "Correction to PRACH resource configuration for high speed scenario in TS 36.211" 3GPP TSG-RAN WG1 Meeting #88, R1-1704132, Athens, Greece, Feb. 13-17, 2017, 15 pages.

CMCC, "Discussion on RACH configuration", 3GPP TSG RAN WG1 #90bis, R1-1717878, Prague, CZ, Oct. 9-13, 2017, 7 pages.

LG Electronics, "On four-step RACH procedure", 3GPP TSG RAN WG1 Meeting #90, R1-1713131, Prague, Czech Republic, Aug. 21-25, 2017, 6 pages.

\* cited by examiner

COMMUNICATION METHOD AND APPARATUS

CROSS-REFERENCE TO RELATED APPLICATIONS

This application is a continuation of International Application No. PCT/CN2018/116262, filed on Nov. 19, 2018, which claims priority to Chinese Patent Application No. 201711149085.X, filed on Nov. 17, 2017. The disclosures of the aforementioned applications are hereby incorporated by reference in their entireties.

TECHNICAL FIELD

The present invention relates to the communications field, and in particular, to communication method and apparatus.

BACKGROUND

Development of mobile services has higher requirements for a data rate and a capacity in wireless communication. To support a higher data rate and a larger user capacity, multi-beam communication is performed in a next-generation communications system (for example, NR (new radio)). Before communicating with a terminal, a base station first needs to perform uplink synchronization and downlink synchronization. In a downlink synchronization process, the base station sends a downlink synchronization signal through a plurality of transmit beams, and the terminal receives and detects the downlink synchronization signal through one or more receive beams, and determines an optimal pair of downlink transmit beam and receive beam, a downlink time, and system information. The uplink synchronization is completed with the help of a random access process. The terminal first sends a random access signal, and the base station detects the random access signal, to obtain an optimal pair of uplink transmit beam and receive beam, an uplink time, and the like, and implements uplink synchronization between the base station and the terminal.

In a current new radio (NR) communications system, there is no suitable method for determining a frequency position of a random access resource. Therefore, when the terminal sends the random access signal, the terminal shoots in the dark on a random access resource, and beams may not match when the base station receives the random access signal, leading to relatively low efficiency of the random access process.

SUMMARY

Embodiments of the present invention provide communication method and apparatus, thereby determining a frequency position of a random access resource in a next-generation communications system.

According to a first aspect, an embodiment of the present invention provides a random access signal sending method, including: receiving, by a terminal device, configuration information from a network device, where the configuration information includes at least one of an initial frequency offset, a random access resource configuration period, an uplink channel bandwidth, a bandwidth of a random access resource, a time period of a random access resource, a time period of the random access resource, and a frequency index of the random access resource; determining, by the terminal device, a frequency position of the random access resource based on the configuration information; and sending a random access signal to the network device at the frequency position of the random access resource. Optionally, the time period is also referred to as slot.

The random access resource is a time-frequency resource used for transmitting a random access preamble, and the random access resource is a time-frequency resource set including a time domain resource and a frequency domain resource. The random access resource occupies a particular time in time domain and occupies a particular bandwidth in frequency domain. A random access resource configuration pattern represents position distribution of all available random access resources in a specified time-frequency resource set. The random access resource configuration period is a time length of the time-frequency resource set, and the time length may be represented through a quantity of system frames, subframes, slots, mini-slots, or OFDM (orthogonal frequency division multiplexing) symbols. The random access resource configuration pattern periodically appears. The frequency position of the random access resource represents an absolute position of the random access resource in frequency domain, and the frequency position of the random access resource uses an RB (resource block) or an RB group (resource block group) as a granularity. For example, with a given bandwidth of the random access resource, the frequency position of the random access resource may be represented through a starting RB position or a middle RB position of the random access resource. The initial frequency offset represents a frequency starting position of an initial available random access resource in the random access resource configuration pattern, for example, is represented through a starting RB position. The uplink channel bandwidth represents a system bandwidth for sending uplink data, and the bandwidth may be represented through a quantity of RBs. The bandwidth of the random access resource represents a bandwidth size occupied by the random access resource in frequency domain. For example, the bandwidth of the random access resource may be represented through a quantity of RBs. The time period of the random access resource represents a time length of the random access resource in time domain, and the time length may be represented through a quantity of subframes, slots, or OFDM symbols. Also, the time period of the random access resource represents an absolute time position of the random access resource, including a system frame number, a subframe number in a system frame, a slot number in a subframe, an OFDM symbol in a slot, or a time position in an OFDM symbol (where a basic time unit is used as a granularity); or represents a relative position of the random access resource within the random access resource configuration period, to be specific, the random access resource exists on T time positions within the random access resource configuration period, where the time period of the random access resource refers to relative positions 0, 1, . . . , and T−1. The frequency index of the random access resource represents an index of the random access resource in frequency domain. The terminal device selects a random access preamble from a random access preamble set and sends the random access preamble at the determined frequency position of the random access resource. For a method for selecting the random access preamble, refer to descriptions in the prior art, and this application imposes no limitation thereon.

The terminal device may be directly notified by the network device of values of various parameters in the configuration information, or the network device sends indexes of the parameters to the terminal device. The parameters in the configuration information may be carried in one message, or may be respectively carried in a plurality of messages. For example, the network device sends the time period of the random access resource through at least one of RRC (radio resource control) signaling, SI (system information), RMSI (remaining minimum system information), NR SIB1 (new radio system information block type 1), MAC CE (media access control control element) signaling, DCI (downlink control information), a PBCH (physical broadcast channel), and a PDCCH order (physical downlink control channel order). The time period of the random access resource may be an absolute time, or may be an index of the time period (for example, a system frame number, a subframe number in a system frame, a slot number in a subframe, or an OFDM symbol in a slot).

The random access resource configuration period (PRACH configuration period/PRACH period/PRACH density) is also referred to as a random access period. Optionally, the random access resource is also referred to as PRACH. The random access resource configuration period includes a plurality of random access resources in a dimension of time, frequency, preamble, or sequence, and these resources constitute a random access resource configuration pattern. The random access resource configuration period is also a time interval at which the random access resource configuration pattern recurs. A random access resource within a random access resource configuration period is associated with all actually transmitted downlink signals in a downlink signal set. It may be understood that the random access resource associated with the downlink signals recurs within the random access resource configuration period.

Based on the foregoing descriptions, the terminal device determines the frequency position of the random access resource based on at least one of the initial frequency offset, the random access resource configuration period, the uplink channel bandwidth, the bandwidth of the random access resource, the time period of the random access resource, and the frequency index of the random access resource that are configured by the network device, and the terminal device sends the random access signal to the network device at the determined frequency position. In this way, the terminal device is prevented from shooting in the dark on a random access resource when sending the random access signal, thereby improving efficiency of a random access process.

In a possible design, the configuration information further includes a frequency hopping offset.

Random access resources in the random access resource configuration pattern are distributed at equal intervals in frequency domain, and the frequency hopping offset represents a frequency position difference between two random access resources adjacent to each other within a same time period.

In a possible design, the determining, by the terminal device a frequency position of the random access resource based on the configuration information specifically includes:

when $\lfloor t_{RA}/T_{RA} \rfloor \bmod 2=0$, $F_{RB}=f_{start}+N_{RA} \times f_{RA}$; or when $\lfloor t_{RA}/T_{RA} \rfloor \bmod 2=1$, $F_{RB}=N_{RB}-f_{start}-N_{RA} \times (f_{RA}+1)$, where $\lfloor \ \rfloor$ represents a rounding down operation; mod represents a modulo operation; $F_{RB}$ is the frequency position of the random access resource, and uses an RB as a granularity; $f_{start}$ is the initial frequency offset, and may be represented through a starting RB position of the initial available random access resource in the random access resource configuration pattern; $T_{RA}$ is the random access resource configuration period; $N_{RB}$ is the uplink channel bandwidth; $N_{RA}$ is the bandwidth of the random access resource; $t_{RA}$ is the time period of the random access resource; and $f_{RA}$ is the frequency index of the random access resource.

Based on the foregoing descriptions, the terminal device sends the random access signal to the network device through frequency hopping. In this way, the terminal device can implement frequency diversity and improve transmission reliability of the random access signal.

In a possible design, the determining, by the terminal device, a frequency position of the random access resource based on the configuration information specifically includes:

when $\lfloor t_{RA}/T_{RA} \rfloor \bmod 2=0$ and $f_{RA} \bmod 2=0$,
$F_{RB}=f_{start}+N_{RA} \times \lfloor f_{RA}/2 \rfloor$;

when $\lfloor t_{RA}/T_{RA} \rfloor \bmod 2=0$ and $f_{RA} \bmod 2=1$,
$F_{RB}=N_{RB}-f_{start}-N_{RA} \times (\lfloor f_{RA}/2 \rfloor +1)$;

when $\lfloor t_{RA}/T_{RA} \rfloor \bmod 2=1$ and $f_{RA} \bmod 2=0$,
$F_{RB}=N_{RB}-f_{start}-N_{RA} \times (\lfloor f_{RA}/2 \rfloor +1)$; or when $\lfloor t_{RA}/T_{RA} \rfloor \bmod 2=1$ and $f_{RA} \bmod 2=1$,
$F_{RB}=f_{start}+N_{RA} \times \lfloor f_{RA}/2 \rfloor$, where $\lfloor \ \rfloor$ represents a rounding down operation, mod represents a modulo operation, $F_{RB}$ is the frequency position of the random access resource, $f_{start}$ is the initial frequency offset, $T_{RA}$ is the random access resource configuration period, $N_{RB}$ is the uplink channel bandwidth, $N_{RA}$ is the bandwidth of the random access resource, $t_{RA}$ is the time period of the random access resource, and $f_{RA}$ is the frequency index of the random access resource.

In a possible design, the determining, by the terminal device, a frequency position of the random access resource based on the configuration information specifically includes:

when $\lfloor t_{RA}/T_{RA} \rfloor \bmod 2=0$, $F_{RB}=f_{start}+N_{RA} \times f_{RA}$; or when $\lfloor t_{RA}/T_{RA} \rfloor \bmod 2=1$, $F_{RB}=(f_{start}+f_{offset}+N_{RA} \times f_{RA}) \bmod N_{RB}$, where $\lfloor \ \rfloor$ represents a rounding down operation, mod represents a modulo operation, $F_{RB}$ is the frequency position of the random access resource, $f_{start}$ is the initial frequency offset, $T_{RA}$ is the random access resource configuration period, $N_{RB}$ is the uplink channel bandwidth, $N_{RA}$ is the bandwidth of the random access resource, $t_{RA}$ is the time period of the random access resource, $f_{RA}$ is the frequency index of the random access resource, and $f_{offset}$ is the frequency hopping offset.

In a possible design, in all of the foregoing formulas, $T_{RA}$ is an absolute time length of the random access resource configuration period, and $t_{RA}$ is an absolute time of the random access resource. For example, the absolute time length of the random access resource configuration period is one of 5 ms, 10 ms, 20 ms, 40 ms, 80 ms, 160 ms, 320 ms, and 640 ms.

In a possible design, in all of the foregoing formulas, $f_{RA}$ is a frequency index of the random access resource in an initial access uplink channel bandwidth part; or $f_{RA}$ is a frequency index of the random access resource in an uplink channel bandwidth; or $f_{start}$ is a preset value 0.

In a possible design, the configuration information further includes a mapping relationship between at least one actually sent downlink signal and a random access resource in a random access resource configuration pattern.

The at least one actually sent downlink signal is a signal sent by the network device for downlink synchronization, and the downlink signal may be at least one of a synchronization signal block (SS block) and a channel state information reference signal (CSI-RS). The SS block may correspond to one or more OFDM symbols. The SS block includes at least one of the following: a primary synchronization signal (PSS), a secondary synchronization signal (SSS), a physical broadcast signal (PBCH), and a demodulation reference signal (DMRS). The SS block may also be referred to as an SS/PBCH block. A plurality of signals in the SS block or the SS/PBCH block may be sent through a same antenna port. The mapping relationship is also referred to as an association relationship, and the at least one actually sent downlink signal may have an association relationship with a plurality of random access resources, or the at least one actually sent downlink signal has a mapping relationship with only one random access resource. Based on different mapping relationships, the terminal device determines the random access resource in different methods.

In a possible design, the configuration information further includes a format of the random access preamble and/or at least one actually sent downlink signal.

In a possible design, the configuration information further includes a frame structure type, uplink/downlink configuration information, or a duplex mode.

The frame structure type includes a TDD frame or an FDD frame. The uplink/downlink configuration information includes an uplink slot, a downlink slot, a quantity of undetermined slots, and period information. The duplex mode includes full duplex, TDD, or FDD.

According to a second aspect, this application provides a random access signal receiving method, including: sending, by a network device, configuration information to a terminal device, where the configuration information includes at least one of an initial frequency offset, a random access resource configuration period, an uplink channel bandwidth, a bandwidth of a random access resource, and a frequency index of the random access resource; determining, by the network device, a frequency position of the random access resource based on the configuration information; and receiving, by the network device, a random access signal from the terminal device at the frequency position of the random access resource.

The terminal device may be directly notified by the network device of values of various parameters in the configuration information, or the network device sends indexes of the parameters to the terminal device. The parameters in the configuration information may be carried in one message, or may be carried in a plurality of messages. For example, the network device sends a time period of the random access resource through at least one of RRC signaling, SI, RMSI, NR SIB1, MAC CE signaling, DCI (downlink control information), a PBCH, and a PDCCH order. The time period of the random access resource may be an absolute time, or may be an index of the time period (for example, a system frame number, a subframe number in a system frame, a slot number in a subframe, or an OFDM symbol in a slot).

Based on the foregoing descriptions, the network device determines the frequency position of the random access resource based on at least one of the initial frequency offset, the random access resource configuration period, the uplink channel bandwidth, the bandwidth of the random access resource, and the frequency index of the random access resource. In this way, the network device can receive, on the random access resource, the random access signal sent by the terminal device, thereby avoiding a beam mismatch problem and improving transmission efficiency of the random access signal.

In a possible design, the configuration information further includes a frequency hopping offset.

In a possible design, the determining, by the network device, a frequency position of the random access resource based on the configuration information specifically includes:

when $\lfloor t_{RA}/T_{RA} \rfloor \bmod 2=0$, $F_{RB}=f_{start}+N_{RA} \times f_{RA}$; or when $\lfloor t_{RA}/T_{RA} \rfloor \bmod 2=1$, $F_{RB}=N_{RB}-f_{start}-N_{RA} \times (f_{RA}+1)$, where $\lfloor \ \rfloor$ represents rounding down, mod represents a modulo operation, $F_{RB}$ is the frequency position of the random access resource, $f_{start}$ is the initial frequency offset, $T_{RA}$ is the random access resource configuration period, $N_{RB}$ is the uplink channel bandwidth, $N_{RA}$ is the bandwidth of the random access resource, $t_{RA}$ is the time period of the random access resource, and $f_{RA}$ is the frequency index of the random access resource.

In a possible design, the determining, by the network device, a frequency position of the random access resource based on the configuration information specifically includes:

when $\lfloor t_{RA}/T_{RA} \rfloor \bmod 2=0$ and $f_{RA} \bmod 2=0$,
$F_{RB}=f_{start}+N_{RA} \times \lfloor f_{RA}/2 \rfloor$;

when $\lfloor t_{RA}/T_{RA} \rfloor \bmod 2=0$ and $f_{RA} \bmod 2=1$,
$F_{RB}=N_{RB}-f_{start}-N_{RA} \times (\lfloor f_{RA}/2 \rfloor+1)$;

when $\lfloor t_{RA}/T_{RA} \rfloor \bmod 2=1$ and $f_{RA} \bmod 2=0$,
$F_{RB}=N_{RB}-f_{start}-N_{RA} \times (\lfloor f_{RA}/2 \rfloor+1)$; or when $\lfloor t_{RA}/T_{RA} \rfloor \bmod 2=1$ and $f_{RA} \bmod 2=1$,
$F_{RB}=f_{start}+N_{RA} \times \lfloor f_{RA}/2 \rfloor$, where $\lfloor \ \rfloor$ represents rounding down, mod represents a modulo operation, $F_{RB}$ is the frequency position of the random access resource, $f_{start}$ is the initial frequency offset, $T_{RA}$ is the random access resource configuration period, $N_{RB}$ is the uplink channel bandwidth, $N_{RA}$ is the bandwidth of the random access resource, $t_{RA}$ is the time period of the random access resource, and $f_{RA}$ is the frequency index of the random access resource.

In a possible design, the determining, by the network device, a frequency position of the random access resource based on the configuration information specifically includes:

when $\lfloor t_{RA}/T_{RA} \rfloor \bmod 2=0$, $F_{RB}=f_{start}+N_{RA} \times f_{RA}$; or when $\lfloor t_{RA}/T_{RA} \rfloor \bmod 2=1$, $F_{RB}=N_{RB}-f_{start}-N_{RA} \times (f_{RA}+1)$, where $\lfloor \ \rfloor$ represents rounding down, mod represents a modulo operation, $F_{RB}$ is the frequency position of the random access resource, $f_{start}$ is the initial frequency offset, $T_{RA}$ is the random access resource configuration period, $N_{RB}$ is the uplink channel bandwidth, $N_{RA}$ is the bandwidth of the random access resource, $t_{RA}$ is the time period of the random access resource, $f_{RA}$ is the frequency index of the random access resource, and $f_{offset}$ is the frequency hopping offset.

In a possible design, the determining, by the network device, a frequency position of the random access resource based on the configuration information specifically includes:

when $\lfloor t_{RA}/T_{RA} \rfloor \bmod 2=0$, $F_{RB}=f_{start}+N_{RA} \times f_{RA}$; or when $\lfloor t_{RA}/T_{RA} \rfloor \bmod 2=1$, $F_{RB}=(f_{start}+f_{offset}+N_{RA} \times f_{RA}) \bmod N_{RB}$, where $\lfloor \ \rfloor$ represents rounding down, mod represents a modulo operation, $F_{RB}$ is the frequency position of the random access resource, $f_{start}$ is the initial frequency offset, $T_{RA}$ is the random access resource configuration period, $N_{RB}$ is the uplink channel bandwidth, $N_{RA}$ is the bandwidth of the random access resource, $t_{RA}$ is the time period of the random access resource, $f_{RA}$ is the frequency index of the random access resource, and $f_{offset}$ is the frequency hopping offset.

In a possible design, the configuration information further includes a mapping relationship between at least one actually sent downlink signal and a random access resource in the random access resource configuration pattern.

In a possible design, the configuration information further includes a format of a random access preamble corresponding to the random access signal and/or at least one actually sent downlink signal.

In a possible design, the configuration information further includes at least one of a system frame structure, uplink/downlink configuration information, and a duplex mode that are corresponding to a random access signal.

According to a third aspect, this application provides a random access signal sending method, including: determining, by a terminal device, a frequency position of a random access resource based on a subcarrier offset of the random access resource and a resource block position of the random access resource; and sending, by the terminal device, a random access signal to a network device at the frequency position of the random access resource.

The frequency position of the random access resource represents an absolute position of the random access resource in frequency domain, and uses a subcarrier or an RE (resource element) as a granularity. The resource block position of the random access resource represents a position of a resource block to which the random access resource belongs, and the resource block position of the random access resource is a coarse-grained frequency position, and cannot accurately represent the frequency position of the random access resource. For example, the resource block position of the random access resource represents a starting RB position or a middle RB position of the random access resource. The subcarrier offset represents a subcarrier offset relative to the resource block position of the random access resource, the subcarrier offset may be a positive value or a negative value, and the subcarrier offset may also be referred to as an RE offset.

Based on the foregoing descriptions, the terminal device determines the frequency position of the random access resource based on the resource block position and the subcarrier offset of the random access resource. In this way, the terminal device can use frequency resources through a subcarrier or an RE as a granularity, thereby improving utilization of the frequency resources.

In a possible design, the determining, by a terminal device, a frequency position of a random access resource based on a subcarrier offset of the random access resource and a resource block position of the random access resource specifically includes:

$F_{SC}=F_{RB} \times N_{SC}^{RB}+M$, where $F_{SC}$ is the frequency position of the random access resource, and uses a subcarrier or an RE as a granularity; $F_{RB}$ is the resource block position of the random access resource, and uses an RB or an RB group as a granularity; $N_{SC}^{RB}$ is a quantity of subcarriers included in one RB; and M is the subcarrier offset.

In a possible design, the subcarrier offset is the same as an offset of at least one actually sent downlink signal; or the subcarrier offset is related to a frequency index and/or a carrier frequency of an initial available random access resource in a random access resource configuration pattern; or the subcarrier offset is indicated through indication information; or the subcarrier offset is a prestored or preconfigured value.

The indication information includes at least one of RRC signaling, SI, RMSI, NR SIB1, MAC CE signaling, DCI (downlink control information), a PBCH, and a PDCCH order. For example, the network device indicates, through the RRC signaling, a manner of obtaining the subcarrier offset, and then indicates a specific offset through the DCI.

In a possible design, before the determining, by a terminal device, a frequency position of a random access resource based on a subcarrier offset and a resource block position of the random access resource, the method further includes: receiving, by the terminal device, configuration information from the network device, where the configuration information includes at least one of an initial frequency offset, a random access resource configuration period, an uplink channel bandwidth, a bandwidth of the random access resource, a time period of a random access resource, a time period of the random access resource, and a frequency index of the random access resource; and determining, by the terminal device, the resource block position of the random access resource based on the configuration information.

In a possible design, before the determining, by a terminal device, a frequency position of a random access resource based on a subcarrier offset and a resource block position of the random access resource, the method further includes: receiving, by the terminal device, the resource block position of the random access resource from the network device.

In a possible design, the configuration information further includes a frequency hopping offset.

The terminal device may be directly notified by the network device of values of various parameters in the configuration information, or the network device sends indexes of the parameters to the terminal device. The parameters in the configuration information may be carried in one message, or may be carried in a plurality of messages. For example, the network device sends a time period of the random access resource through at least one of RRC signaling, SI, RMSI, NR SIB1, MAC CE signaling, DCI (downlink control information), a PBCH, and a PDCCH order. The time period of the random access resource may be an absolute time, or may be an index of the time period (for example, a system frame number, a subframe number in a system frame, a slot number in a subframe, or an OFDM symbol in a slot).

In a possible design, the determining, by the terminal device, the resource block position of the random access resource based on the configuration information specifically includes:

when $\lfloor t_{RA}/T_{RA} \rfloor$ mod $2=0$, $F_{RB}=f_{start}+N_{RA} \times f_{RA}$; or when $\lfloor t_{RA}/T_{RA} \rfloor$ mod $2=1$, $F_{RB}=N_{RB}-f_{start}-N_{RA} \times (f_{RA}+1)$, where $\lfloor \ \rfloor$ represents rounding down, mod represents a modulo operation, $F_{RB}$ is the resource block position of the random access resource, $f_{start}$ is the initial frequency offset, $T_{RA}$ is the random access resource configuration period, $N_{RB}$ is the uplink channel bandwidth, $N_{RA}$ is the bandwidth of the random access resource, $t_{RA}$ is the time period of the random access resource, and $f_{RA}$ is the frequency index of the random access resource.

In a possible design, the determining, by the terminal device, the resource block position of the random access resource based on the configuration information specifically includes:

when $\lfloor t_{RA}/T_{RA} \rfloor$ mod $2=0$ and $f_{RA}$ mod $2=0$,
$F_{RB}=f_{start}+N_{RA} \times \lfloor f_{RA}/2 \rfloor$;

when $\lfloor t_{RA}/T_{RA} \rfloor$ mod $2=0$ and $f_{RA}$ mod $2=1$,
$F_{RB}=N_{RB}-f_{start}-N_{RA} \times (\lfloor f_{RA}/2 \rfloor+1)$;

when $\lfloor t_{RA}/T_{RA}\rfloor \bmod 2=1$ and $f_{RA} \bmod 2=0$,
$F_{RB}=N_{RB}-f_{start}-N_{RA}\times(\lfloor f_{RA}/2\rfloor+1)$; or when $\lfloor t_{RA}/T_{RA}\rfloor \bmod 2=1$ and $f_{RA} \bmod 2=1$,
$F_{RB}=f_{start}+N_{RA}\times\lfloor f_{RA}/2\rfloor$, where $\lfloor \ \rfloor$ represents rounding down, mod represents a modulo operation, $F_{RB}$ is the resource block position of the random access resource, $f_{start}$ is the initial frequency offset, $T_{RA}$ is the random access resource configuration period, $N_{RB}$ is the uplink channel bandwidth, $t_{RA}$ is the bandwidth of the random access resource, $t_{RA}$ is the time period of the random access resource, and $f_{RA}$ is the frequency index of the random access resource.

In a possible design, the determining, by the terminal device, the resource block position of the random access resource based on the configuration information specifically includes:

when $\lfloor t_{RA}/T_{RA}\rfloor \bmod 2=0$, $F_{RB}=f_{start}+N_{RA}\times f_{RA}$; or when $\lfloor t_{RA}/T_{RA}\rfloor \bmod 2=1$, $F_{RB}=(f_{start}+f_{offset}+N_{RA}\times f_{RA})\bmod N_{RB}$, where $\lfloor \ \rfloor$ represents rounding down, mod represents a modulo operation, $F_{RB}$ is the resource block position of the random access resource, $f_{start}$ is the initial frequency offset, $T_{RA}$ is the random access resource configuration period, $N_{RB}$ is the uplink channel bandwidth, $N_{RA}$ is the bandwidth of the random access resource, $t_{RA}$ is the time period of the random access resource, $f_{RA}$ is the frequency index of the random access resource, and $f_{offset}$ is the frequency hopping offset.

In a possible design, the configuration information further includes a mapping relationship between at least one actually sent downlink signal and a random access resource in a random access resource configuration pattern.

In a possible design, the configuration information further includes a format of a random access preamble corresponding to the random access signal and/or at least one actually sent downlink signal.

In a possible design, the configuration information further includes at least one of a frame structure, uplink/downlink configuration information, and a duplex mode.

According to a fourth aspect, an embodiment of the present invention provides a random access signal receiving method, including: determining, by a network device, a frequency position of a random access resource based on a subcarrier offset and a resource block position of the random access resource; and receiving, by the network device, a random access signal from a terminal device at the frequency position of the random access resource.

In a possible design, the determining, by a network device, a frequency position of a random access resource based on a subcarrier offset and a resource block position of the random access resource specifically includes:

$F_{SC}=F_{RB}\times N_{SC}^{RB}+M$, where $F_{SC}$ is the frequency position of the random access resource, $F_{RB}$ is the resource block position of the random access resource, $N_{SC}^{RB}$ is a quantity of subcarriers in a resource block RB, and M is the subcarrier offset.

In a possible design, the subcarrier offset is the same as an offset of at least one actually sent downlink signal; or the subcarrier offset is related to a frequency index and/or a carrier frequency of an initial available random access resource in a random access resource configuration pattern; or the subcarrier offset is indicated through indication information, and the indication information is not used to indicate an offset of the at least one actually sent downlink signal; or the subcarrier offset is a prestored or preconfigured value.

The indication information includes at least one of RRC signaling, SI, RMSI, NR SIB1, MAC CE signaling, DCI, a PBCH, and a PDCCH order. For example, the network device indicates, through the RRC signaling, a manner of obtaining the subcarrier offset, and then indicates a specific offset through the DCI.

In a possible design, before the determining, by a network device, a frequency position of a random access resource based on a subcarrier offset and a resource block position of the random access resource, the method further includes: sending, by the network device, configuration information to the terminal device, where the configuration information includes at least one of an initial frequency offset, a random access resource configuration period, an uplink channel bandwidth, a bandwidth of the random access resource, a time period of a random access resource, a time period of the random access resource, and a frequency index of the random access resource.

In a possible design, before the determining, by a network device, a frequency position of a random access resource based on a subcarrier offset and a resource block position of the random access resource, the method further includes: determining, by the network device, the resource block position of the random access resource based on the configuration information, where the configuration information includes at least one of an initial frequency offset, a random access resource configuration period, an uplink channel bandwidth, a bandwidth of the random access resource, a time period of a random access resource, a time period of the random access resource, and a frequency index of the random access resource; and sending, by the network device, the resource block position of the random access resource to the terminal device.

In a possible design, the configuration information further includes a frequency hopping offset.

The terminal device may be directly notified by the network device of values of various parameters in the configuration information, or the network device sends indexes of the parameters to the terminal device. The parameters in the configuration information may be carried in one message, or may be carried in a plurality of messages. For example, the network device sends a time period of the random access resource through at least one of RRC signaling, SI, RMSI, NR SIB1, MAC CE signaling, DCI (downlink control information), a PBCH, and a PDCCH order. The time period of the random access resource may be an absolute time, or may be an index of the time period (for example, a system frame number, a subframe number in a system frame, a slot number in a subframe, or an OFDM symbol in a slot).

In a possible design, the determining, by the network device, the resource block position of the random access resource based on the configuration information specifically includes:

when $\lfloor t_{RA}/T_{RA}\rfloor \bmod 2=0$, $F_{RB}=f_{start}+N_{RA}\times f_{RA}$; or when $\lfloor t_{RA}/T_{RA}\rfloor \bmod 2=1$, $F_{RB}=N_{RB}-f_{start}-N_{RA}\times(f_{RA}+1)$, where $\lfloor \ \rfloor$ represents rounding down, mod represents a modulo operation, $F_{RB}$ is the resource block position of the random access resource, $f_{start}$ is the initial frequency offset, $T_{RA}$ is the random access resource configuration period, $N_{RB}$ is the uplink channel bandwidth, $N_{RA}$ is the bandwidth of the random access resource, $t_{RA}$ is the time period of the random access resource, and $f_{RA}$ is the frequency index of the random access resource.

In a possible design, the determining, by the network device, the resource block position of the random access resource based on the configuration information specifically includes:

when $\lfloor t_{RA}/T_{RA} \rfloor$ mod 2=0 and $f_{RA}$ mod 2=0,
$F_{RB}=f_{start}+N_{RA}\times \lfloor f_{RA}/2 \rfloor$;

when $\lfloor t_{RA}/T_{RA} \rfloor$ mod 2=0 and $f_{RA}$ mod 2=1,
$F_{RB}=N_{RB}-f_{start}-N_{RA}\times(\lfloor f_{RA}/2 \rfloor+1)$;

when $\lfloor t_{RA}/T_{RA} \rfloor$ mod 2=1 and $f_{RA}$ mod 2=0,
$F_{RB}=N_{RB}-f_{start}-N_{RA}\times(\lfloor f_{RA}/2 \rfloor+1)$; or when $\lfloor t_{RA}/T_{RA} \rfloor$ mod 2=1 and $f_{RA}$ mod 2=1,
$F_{RB}=f_{start}+N_{RA}\times \lfloor f_{RA}/2 \rfloor$, where $\lfloor \ \rfloor$ represents rounding down, mod represents a modulo operation, $F_{RB}$ is the resource block position of the random access resource, $f_{start}$ is the initial frequency offset, $T_{RA}$ is the random access resource configuration period, $N_{RB}$ is the uplink channel bandwidth, $N_{RA}$ is the bandwidth of the random access resource, $t_{RA}$ is the time period of the random access resource, and $f_{RA}$ is the frequency index of the random access resource.

In a possible design, the determining, by the network device, the resource block position of the random access resource based on the configuration information specifically includes:

when $\lfloor t_{RA}/T_{RA} \rfloor$ mod 2=0, $F_{RB}=f_{start}+N_{RA}\times f_{RA}$; or when $\lfloor t_{RA}/T_{RA} \rfloor$ mod 2=1, $F_{RB}=(f_{start}+f_{offset}+N_{RA}\times f_{RA})$ mod $N_{RB}$, where $\lfloor \ \rfloor$ represents rounding down, mod represents a modulo operation, $F_{RB}$ is the resource block position of the random access resource, $f_{start}$ is the initial frequency offset, $T_{RA}$ is the random access resource configuration period, $N_{RB}$ is the uplink channel bandwidth, $N_{RA}$ is the bandwidth of the random access resource, $t_{RA}$ is the time period of the random access resource, $f_{RA}$ is the frequency index of the random access resource, and $f_{offset}$ is the frequency hopping offset.

In a possible design, in all of the foregoing formulas, $T_{RA}$ is an absolute time length of the random access resource configuration period, and $t_{RA}$ is an absolute time of the random access resource. For example, the absolute time length of the random access resource configuration period is one of 5 ms, 10 ms, 20 ms, 40 ms, 80 ms, 160 ms, 320 ms, and 640 ms.

In a possible design, in all of the foregoing formulas, $f_{RA}$ is a frequency index of the random access resource in an initial access uplink channel bandwidth part; or $f_{RA}$ is a frequency index of the random access resource in an uplink channel bandwidth; or $f_{start}$ is a preset value 0.

In a possible design, the configuration information further includes a mapping relationship between at least one actually sent downlink signal and a random access resource in a random access resource configuration pattern.

In a possible design, the configuration information further includes a format of a random access preamble corresponding to the random access signal and/or at least one actually sent downlink signal.

In a possible design, the configuration information further includes at least one of a frame structure, uplink/downlink configuration information, and a duplex mode.

According to a fifth aspect, this application provides a random access signal sending apparatus, including a receiving unit, a processing unit, and a sending unit. The receiving unit is configured to receive configuration information from a network device, where the configuration information includes at least one of an initial frequency offset, a random access resource configuration period, an uplink channel bandwidth, a bandwidth of the random access resource, a time period of a random access resource, a time period of the random access resource, and a frequency index of the random access resource. The processing unit is configured to determine a frequency position of the random access resource based on the configuration information. The sending unit is configured to send a random access signal to the network device at the frequency position of the random access resource.

In a possible design, the configuration information further includes a frequency hopping offset.

In a possible design, that the processing unit is configured to determine a frequency position of the random access resource based on the configuration information specifically includes:

when $\lfloor t_{RA}/T_{RA} \rfloor$ mod 2=0, $F_{RB}=f_{start}+N_{RA}\times f_{RA}$; or when $\lfloor t_{RA}/T_{RA} \rfloor$ mod 2=1, $F_{RB}=N_{RB}-f_{start}-N_{RA}\times(f_{RA}+1)$, where $\lfloor \ \rfloor$ represents rounding down, mod represents a modulo operation, $F_{RB}$ is the frequency position of the random access resource, $f_{start}$ is the initial frequency offset, $T_{RA}$ is the random access resource configuration period, $N_{RB}$ is the uplink channel bandwidth, $t_{RA}$ is the bandwidth of the random access resource, $t_{RA}$ is the time period of the random access resource, and $f_{RA}$ is the frequency index of the random access resource.

In a possible design, that the processing unit is configured to determine a frequency position of the random access resource based on the configuration information specifically includes:

when $\lfloor t_{RA}/T_{RA} \rfloor$ mod 2=0 and $f_{RA}$ mod 2=0,
$F_{RB}=f_{start}+N_{RA}\times \lfloor f_{RA}/2 \rfloor$;

when $\lfloor t_{RA}/T_{RA} \rfloor$ mod 2=0 and $f_{RA}$ mod 2=1,
$F_{RB}=N_{RB}-f_{start}-N_{RA}\times(\lfloor f_{RA}/2 \rfloor+1)$;

when $\lfloor t_{RA}/T_{RA} \rfloor$ mod 2=1 and $f_{RA}$ mod 2=0,
$F_{RB}=N_{RB}-f_{start}-N_{RA}\times(\lfloor f_{RA}/2 \rfloor+1)$; or when $\lfloor t_{RA}/T_{RA} \rfloor$ mod 2=1 and $f_{RA}$ mod 2=1,
$F_{RB}=f_{start}+N_{RA}\times \lfloor f_{RA}/2 \rfloor$, where $\lfloor \ \rfloor$ represents rounding down, mod represents a modulo operation, $F_{RB}$ is the frequency position of the random access resource, $f_{start}$ is the initial frequency offset, $T_{RA}$ is the random access resource configuration period, $N_{RB}$ is the uplink channel bandwidth, $N_{RA}$ is the bandwidth of the random access resource, $t_{RA}$ is the time period of the random access resource, and $f_{RA}$ is the frequency index of the random access resource.

In a possible design, that the processing unit is configured to determine a frequency position of the random access resource based on the configuration information specifically includes:

when $\lfloor t_{RA}/T_{RA} \rfloor$ mod 2=0, $F_{RB}=f_{start}+N_{RA}\times f_{RA}$; or when $\lfloor t_{RA}/T_{RA} \rfloor$ mod 2=1, $F_{RB}=(f_{start}+f_{offset}+N_{RA}\times f_{RA})$ mod $N_{RB}$, where $\lfloor \ \rfloor$ represents rounding down, mod represents a modulo operation, $F_{RB}$ is the frequency position of the random access resource, $f_{start}$ is the initial frequency offset, $T_{RA}$ is the random access resource configuration period, $N_{RB}$ is the uplink channel bandwidth, $t_{RA}$ is the bandwidth of the random access resource, $t_{RA}$ is the time period of the random access resource, $f_R$ is the frequency index of the random access resource, and $f_{offset}$ is the frequency hopping offset.

In a possible design, the configuration information further includes a mapping relationship between at least one actually sent downlink signal and a random access resource in a random access resource configuration pattern.

In a possible design, the configuration information further includes a format of a random access preamble corresponding to the random access signal and/or at least one actually sent downlink signal.

In a possible design, the configuration information further includes at least one of a system frame structure, uplink/downlink configuration information, and a duplex mode that are corresponding to the random access preamble.

According to a sixth aspect, this application provides a random access signal receiving apparatus, including a sending unit, a processing unit, and a receiving unit. The sending unit is configured to send configuration information to a terminal device, where the configuration information includes at least one of an initial frequency offset, a random access resource configuration period, an uplink channel bandwidth, a bandwidth of a random access resource, a time period of the random access resource, and a frequency index of the random access resource. The processing unit is configured to determine a frequency position of the random access resource based on the configuration information. The receiving unit is configured to receive a random access signal from a terminal device at the frequency position of the random access resource.

In a possible design, the configuration information further includes a frequency hopping offset.

In a possible design, that the processing unit is configured to determine a frequency position of the random access resource based on the configuration information specifically includes:

when $\lfloor t_{RA}/T_{RA} \rfloor$ mod $2=0$, $F_{RB}=f_{start}+N_{RA}\times f_{RA}$; or when $\lfloor t_{RA}/T_{RA} \rfloor$ mod $2=1$, $F_{RB}=N_{RB}-f_{start}-N_{RA}\times (f_{RA}+1)$, where $\lfloor \ \rfloor$ represents rounding down, mod represents a modulo operation, $F_{RB}$ is the frequency position of the random access resource, $f_{start}$ is the initial frequency offset, $T_{RA}$ is the random access resource configuration period, $N_{RB}$ is the uplink channel bandwidth, $N_{RA}$ is the bandwidth of the random access resource, $t_{RA}$ is a time period of the random access resource, and $f_{RA}$ is the frequency index of the random access resource.

In a possible design, that the processing unit is configured to determine a frequency position of the random access resource based on the configuration information specifically includes:

when $\lfloor t_{RA}/T_{RA} \rfloor$ mod $2=0$ and $f_{RA}$ mod $2=0$,
$F_{RB}=f_{start}+N_{RA}\times \lfloor f_{RA}/2 \rfloor$;

when $\lfloor t_{RA}/T_{RA} \rfloor$ mod $2=0$ and $f_{RA}$ mod $2=1$,
$F_{RB}=N_{RB}-f_{start}-N_{RA}\times (\lfloor f_{RA}/2 \rfloor+1)$;

when $\lfloor t_{RA}/T_{RA} \rfloor$ mod $2=1$ and $f_{RA}$ mod $2=0$,
$F_{RB}=N_{RB}-f_{start}-N_{RA}\times (\lfloor f_{RA}/2 \rfloor+1)$; or when $\lfloor t_{RA}/T_{RA} \rfloor$ mod $2=1$ and $f_{RA}$ mod $2=1$,
$F_{RB}=f_{start}+N_{RA}\times \lfloor f_{RA}/2 \rfloor$, where $\lfloor \ \rfloor$ represents rounding down, mod represents a modulo operation, $F_{RB}$ is the frequency position of the random access resource, $f_{start}$ is the initial frequency offset, $T_{RA}$ is the random access resource configuration period, $N_{RB}$ is the uplink channel bandwidth, $N_{RA}$ is the bandwidth of the random access resource, $t_{RA}$ is a time period of the random access resource, and $f_{RA}$ is the frequency index of the random access resource.

In a possible design, that the processing unit is configured to determine a frequency position of the random access resource based on the configuration information specifically includes:

when $\lfloor t_{RA}/T_{RA} \rfloor$ mod $2=0$, $F_{RB}=f_{start}+N_{RA}\times f_{RA}$; or when $\lfloor t_{RA}/T_{RA} \rfloor$ mod $2=1$, $F_{RB}=(f_{start}+f_{offset}+N_{RA}\times f_{RA})$mod $N_{RB}$, where $\lfloor \ \rfloor$ represents rounding down, mod represents a modulo operation, $F_{RB}$ is the frequency position of the random access resource, $f_{start}$ is the initial frequency offset, $T_{RA}$ is the random access resource configuration period, $N_{RB}$ is the uplink channel bandwidth, $N_{RA}$ is the bandwidth of the random access resource, $t_{RA}$ is a time period of the random access resource, $f_{RA}$ is the frequency index of the random access resource, and $f_{offset}$ is the frequency hopping offset.

In a possible design, the configuration information further includes a mapping relationship between at least one actually sent downlink signal and a random access resource in a random access resource configuration pattern.

In a possible design, the configuration information further includes a format of a random access preamble corresponding to the random access signal and/or at least one actually sent downlink signal.

In a possible design, the configuration information further includes at least one of a system frame structure, uplink/downlink configuration information, and a duplex mode that are corresponding to the random access preamble.

According to a seventh aspect, this application provides a random access signal sending apparatus, including a processing unit and a sending unit.

The processing unit is configured to determine a frequency position of a random access resource based on a subcarrier offset and a resource block position of the random access resource. The sending unit is configured to send a random access signal to a network device at the frequency position of the random access resource.

In a possible design, that the processing unit is configured to determine a frequency position of a random access resource based on a subcarrier offset and a resource block position of the random access resource specifically includes:
$F_{SC}=F_{RB}\times N_{SC}^{RB}+M$, where $F_{SC}$ is the frequency position of the random access resource, $F_{RB}$ is the resource block position of the random access resource, $N_{SC}^{RB}$ is a quantity of subcarriers in a resource block RB, and M is the subcarrier offset.

In a possible design, the subcarrier offset is the same as an offset of at least one actually sent downlink signal; or the subcarrier offset is related to a frequency index and/or a carrier frequency of an initial random access resource in a random access resource configuration pattern corresponding to the random access resource; or the subcarrier offset is indicated through the following indication information: at least one of radio resource control RRC signaling, system information SI, remaining minimum system information RMSI, a new radio system information block type 1 NR SIB1, MAC CE signaling, downlink control information DCI, a physical broadcast channel PBCH, and a PDCCH order.

In a possible design, the apparatus further includes a receiving unit. The receiving unit is configured to receive configuration information from the network device, where the configuration information includes at least one of an initial frequency offset, a random access resource configuration period, an uplink channel bandwidth, a bandwidth of the random access resource, a time period of a random access resource, a time period of the random access resource, and a frequency index of the random access resource.

The processing unit is further configured to determine the resource block position of the random access resource based on the configuration information.

Also, in a possible design, the apparatus further includes a receiving unit, configured to receive the resource block position of the random access resource from the network device.

In a possible design, the configuration information further includes a frequency hopping offset.

In a possible design, that the processing unit is configured to determine the resource block position of the random access resource based on the configuration information specifically includes:

when $\lfloor t_{RA}/T_{RA} \rfloor$ mod 2=0, $F_{RB}=f_{start}+N_{RA}\times f_{RA}$; or when $\lfloor t_{RA}/T_{RA} \rfloor$ mod 2=1, $F_{RB}=N_{RB}-f_{start}-N_{RA}\times(f_{RA}+1)$, where $\lfloor \; \rfloor$ represents rounding down, mod represents a modulo operation, $F_{RB}$ is the resource block position of the random access resource, $f_{start}$ is the initial frequency offset, $T_{RA}$ is the random access resource configuration period, $N_{RB}$ is the uplink channel bandwidth, $N_{RA}$ is the bandwidth of the random access resource, $t_{RA}$ is the time period of the random access resource, and $f_{RA}$ is the frequency index of the random access resource.

In a possible design, that the processing unit is configured to determine the resource block position of the random access resource based on the configuration information specifically includes:

when $\lfloor t_{RA}/T_{RA} \rfloor$ mod 2=0 and $f_{RA}$ mod 2=0,
$F_{RB}=f_{start}+N_{RA}\times\lfloor f_{RA}/2 \rfloor$;

when $\lfloor t_{RA}/T_{RA} \rfloor$ mod 2=0 and $f_{RA}$ mod 2=1,
$F_{RB}=N_{RB}-f_{start}-N_{RA}\times(\lfloor f_{RA}/2 \rfloor+1)$;

when $\lfloor t_{RA}/T_{RA} \rfloor$ mod 2=1 and $f_{RA}$ mod 2=0,
$F_{RB}=N_{RB}-f_{start}-N_{RA}\times(\lfloor f_{RA}/2 \rfloor+1)$; or when $\lfloor t_{RA}/T_{RA} \rfloor$ mod 2=1 and $f_{RA}$ mod 2=1,
$F_{RB}=f_{start}+N_{RA}\times\lfloor f_{RA}/2 \rfloor$, where $\lfloor \; \rfloor$ represents rounding down, mod represents a modulo operation, $F_{RB}$ is the resource block position of the random access resource, $f_{start}$ is the initial frequency offset, $T_{RA}$ is the random access resource configuration period, $N_{RB}$ is the uplink channel bandwidth, $N_{RA}$ is the bandwidth of the random access resource, $t_{RA}$ is the time period of the random access resource, and $f_{RA}$ is the frequency index of the random access resource.

In a possible design, that the processing unit is configured to determine the resource block position of the random access resource based on the configuration information specifically includes:

when $\lfloor t_{RA}/T_{RA} \rfloor$ mod 2=0, $F_{RB}=f_{start}+N_{RA}\times f_{RA}$; or when $\lfloor t_{RA}/T_{RA} \rfloor$ mod 2=1, $F_{RB}=(f_{start}+f_{offset}+N_{RA}\times f_{RA})$ mod $N_{RB}$, where $\lfloor \; \rfloor$ represents rounding down, mod represents a modulo operation, $F_{RB}$ is the resource block position of the random access resource, $f_{start}$ is the initial frequency offset, $T_{RA}$ is the random access resource configuration period, $N_{RB}$ is the uplink channel bandwidth, $N_{RA}$ is the bandwidth of the random access resource, $t_{RA}$ is the time period of the random access resource, $f_{RA}$ is the frequency index of the random access resource, and $f_{offset}$ is the frequency hopping offset.

In a possible design, the configuration information further includes a mapping relationship between at least one actually sent downlink signal and a random access resource in a random access resource configuration pattern.

In a possible design, the configuration information further includes a format of a random access preamble corresponding to the random access signal and/or at least one actually sent downlink signal.

In a possible design, the configuration information further includes at least one of a frame structure, uplink/downlink configuration information, and a duplex mode.

According to an eighth aspect, this application provides a random access signal receiving apparatus, including a processing unit and a receiving unit.

The processing unit is configured to determine a frequency position of a random access resource based on a resource block position and a subcarrier offset of the random access resource. The receiving unit is configured to receive a random access signal from a terminal device at the frequency position of the random access resource.

In a possible design, that the processing unit is configured to determine a frequency position of a random access resource based on a subcarrier offset and a resource block position of the random access resource specifically includes:

$F_{SC}=F_{RB}\times N_{SC}^{RB}+M$, where $F_{SC}$ is the frequency position of the random access resource, $F_{RB}$ is the resource block position of the random access resource, $N_{SC}^{RB}$ is a quantity of subcarriers in a resource block RB, and M is the subcarrier offset.

In a possible design, the subcarrier offset is the same as an offset of at least one actually sent downlink signal; the subcarrier offset is related to a frequency index and/or a carrier frequency of an initial random access resource in a random access resource configuration pattern corresponding to the random access resource; or the subcarrier offset is indicated through the following indication information: at least one of radio resource control RRC signaling, system information SI, remaining minimum system information RMSI, a new radio system information block type 1 NR SIB1, MAC CE signaling, downlink control information DCI, a physical broadcast channel PBCH, and a PDCCH order.

The indication information is not used to indicate an offset of the at least one actually sent downlink signal.

In a possible design, the apparatus further includes a sending unit. The sending unit is configured to send configuration information to the terminal device, where the configuration information includes at least one of an initial frequency offset, a random access resource configuration period, an uplink channel bandwidth, a bandwidth of the random access resource, a time period of a random access resource, a time period of the random access resource, and a frequency index of the random access resource.

Also, in a possible design, the apparatus further includes a sending unit. The processing unit is further configured to determine the resource block position of the random access resource, where the configuration information includes at least one of an initial frequency offset, a random access resource configuration period, an uplink channel bandwidth, a bandwidth of the random access resource, a time period of a random access resource, a time period of the random access resource, and a frequency index of the random access resource. The sending unit is configured to send the resource block position of the random access resource to the terminal device.

In a possible design, the configuration information further includes a frequency hopping offset.

In a possible design, that the processing unit is configured to determine the resource block position of the random access resource based on the configuration information specifically includes:

when $\lfloor t_{RA}/T_{RA} \rfloor$ mod 2=0, $F_{RB}=f_{start}+N_{RA} \times f_{RA}$; or when $\lfloor t_{RA}/T_{RA} \rfloor$ mod 2=1, $F_{RB}=N_{RB}-f_{start}-N_{RA} \times (f_{RA}+1)$, where $\lfloor \ \rfloor$ represents rounding down, mod represents a modulo operation, $F_{RB}$ is the resource block position of the random access resource, $f_{start}$ is the initial frequency offset, $T_{RA}$ is the random access resource configuration period, $N_{RB}$ is the uplink channel bandwidth, $N_{RA}$ is the bandwidth of the random access resource, $t_{RA}$ is the time period of the random access resource, and $f_{RA}$ is the frequency index of the random access resource.

In a possible design, that the processing unit is configured to determine the resource block position of the random access resource based on the configuration information specifically includes:

when $\lfloor t_{RA}/T_{RA} \rfloor$ mod 2=0 and $f_{RA}$ mod 2=0, $F_{RB}=f_{start}+N_{RA} \times \lfloor f_{RA}/2 \rfloor$;

when $\lfloor t_{RA}/T_{RA} \rfloor$ mod 2=0 and $f_{RA}$ mod 2=1, $F_{RB}=N_{RB}-f_{start}-N_{RA} \times (\lfloor f_{RA}/2 \rfloor+1)$;

when $\lfloor t_{RA}/T_{RA} \rfloor$ mod 2=1 and $f_{RA}$ mod 2=0, $F_{RB}=N_{RB}-f_{start}-N_{RA} \times (\lfloor f_{RA}/2 \rfloor+1)$; or when $\lfloor t_{RA}/T_{RA} \rfloor$ mod 2=1 and $f_{RA}$ mod 2=1, $F_{RB}=f_{start}+N_{RA} \times \lfloor f_{RA}/2 \rfloor$, where $\lfloor \ \rfloor$ represents rounding down, mod represents a modulo operation, $F_{RB}$ is the resource block position of the random access resource, $f_{start}$ is the initial frequency offset, $T_{RA}$ is the random access resource configuration period, $N_{RB}$ is the uplink channel bandwidth, $N_{RA}$ is the bandwidth of the random access resource, $t_{RA}$ is the time period of the random access resource, and $f_{RA}$ is the frequency index of the random access resource.

In a possible design, that the processing unit is configured to determine the resource block position of the random access resource based on the configuration information specifically includes:

when $\lfloor t_{RA}/T_{RA} \rfloor$ mod 2=0, $F_{RB}=f_{start}+N_{RA} \times f_{RA}$; or when $\lfloor t_{RA}/T_{RA} \rfloor$ mod 2=1, $F_{RB}=(f_{start}+f_{offset}+N_{RA} \times f_{RA})$ mod $N_{RB}$, where $\lfloor \ \rfloor$ represents rounding down, mod represents a modulo operation, $F_{RB}$ is the resource block position of the random access resource, $f_{start}$ is the initial frequency offset, $T_{RA}$ is the random access resource configuration period, $N_{RB}$ is the uplink channel bandwidth, $N_{RA}$ is the bandwidth of the random access resource, $t_{RA}$ is the time period of the random access resource, $f_{RA}$ is the frequency index of the random access resource, and $f_{offset}$ is the frequency hopping offset.

In a possible design, the configuration information further includes a mapping relationship between at least one actually sent downlink signal and a random access resource in a random access resource configuration pattern.

In a possible design, the configuration information further includes a format of a random access preamble corresponding to the random access signal and/or at least one actually sent downlink signal.

In a possible design, the configuration information further includes at least one of a frame structure, uplink/downlink configuration information, and a duplex mode.

According to a ninth aspect, this application provides a random access signal sending apparatus. The apparatus includes a processor and a memory. The memory is configured to store a program, and the processor invokes the program stored in the memory to perform the method provided in the first aspect of this application.

According to a tenth aspect, this application provides a random access signal receiving apparatus. The apparatus includes a processor and a memory. The memory is configured to store a program, and the processor invokes the program stored in the memory to perform the method provided in the second aspect of this application.

According to an eleventh aspect, this application provides a random access signal sending apparatus. The apparatus includes a processor and a memory. The memory is configured to store a program, and the processor invokes the program stored in the memory to perform the method provided in the third aspect of this application.

According to a twelfth aspect, this application provides a random access signal receiving apparatus. The apparatus includes a processor and a memory. The memory is configured to store a program, and the processor invokes the program stored in the memory to perform the method provided in the fourth aspect of this application.

According to a thirteenth aspect, this application provides a computer-readable storage medium, where the computer-readable storage medium includes a program designed for performing the foregoing aspects.

According to a fourteenth aspect, an embodiment of this application provides a computer program product. The computer program product includes an instruction. When executed by a computer, the computer program product enables the computer to perform a procedure in the method according to either the first aspect or the fourth aspect.

BRIEF DESCRIPTION OF THE DRAWINGS

To describe the technical solutions in the embodiments of the present invention more clearly, the following briefly describes the accompanying drawings required for describing the embodiments of the present invention.

DETAILED DESCRIPTION OF ILLUSTRATIVE EMBODIMENTS

Embodiments of this application may be applied to a wireless communications system. It should be noted that the wireless communications system mentioned in the embodiments of this application includes but is not limited to a narrowband Internet of things (NB-IoT) system, a global system for mobile communications (GSM), an enhanced data rate for GSM evolution (EDGE) system, a wideband code division multiple access (WCDMA) system, a code division multiple access 2000 (CDMA2000) system, a time division-synchronization code division multiple access (TD-SCDMA) system, a long term evolution (LTE) system, an NR (new radio) communications system, and three main application scenarios of a next-generation 5G mobile communications system: enhanced mobile broadband (eMBB), URLLC, and massive machine-type communications (mMTC).

In the embodiments of this application, a terminal device includes but is not limited to a mobile station (MS), a mobile terminal device (Mobile Terminal), a mobile telephone, a handset, portable equipment, and the like. The terminal device may communicate with one or more core networks through a radio access network (RAN). For example, the terminal device may be a mobile telephone (or referred to as a "cellular" telephone), or a computer having a wireless communication function, or the terminal device may be a portable, pocket-sized, handheld, computer built-in, or in-vehicle mobile apparatus or device.

Figure 1:
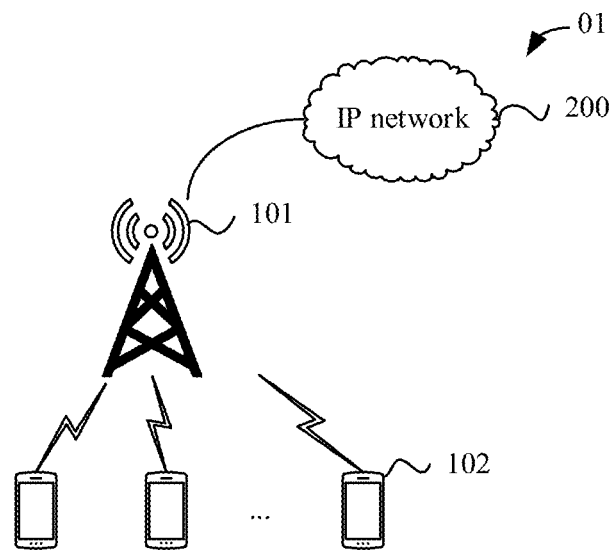
FIG. 1 is a network architectural diagram of a communications system according to an embodiment of the present invention.

FIG. 1 is a schematic architectural diagram of a communications system according to this application.

As shown in FIG. 1, the communications system 01 includes a network device 101 and a terminal device 102. When the communications system 01 includes a core network, the network device 101 may further be connected to the core network. The network device 101 may further communicate with an internet protocol (IP) network 200, for example, the Internet (internet), a private IP network, or another data network. The network device provides a service for a terminal device within a coverage area. For example, referring to FIG. 1, the network device 101 provides wireless access for one or more terminal devices within the coverage area of the network device 101. In addition, network devices may further communicate with each other.

The network device 101 may be a device that is configured to communicate with the terminal device, and may be, for example, a base transceiver station (BTS) in a GSM system or CDMA system, or may be a NodeB (NB) in a WCDMA system, or may be an evolved NodeB (eNB or eNodeB) in an LTE system or a network side device in a future 5G network. Also, the network device may be a relay station, an access point, a vehicle-mounted device, or the like. In a terminal device-to-terminal device (D2D) communications system, the network device may also be a terminal device playing a role of a base station. The terminal device may include various handheld devices, vehicle-mounted devices, wearable devices, and computing devices that have a wireless communication function, or other processing devices connected to a wireless modem, and various forms of user equipment (UE), mobile stations (MS), and the like.

In an NR communications system, formats of a random access preamble are classified into two types. When a sequence length is 839, the random access preamble has four formats, which are a format 0 to a format 3 respectively, as shown in Table 1.

TABLE 1

| Random access preamble format | Sequence length | Subcarrier spacing | Time length |
| --- | --- | --- | --- |
| 0 | 839 | 1.25 kHz | 1 ms |
| 1 | 839 | 1.25 kHz | 3 ms |
| 2 | 839 | 1.25 kHz | 3.5 ms |
| 3 | 839 | 5 kHz | 1 ms |

When the sequence length is 127 or 139, the random access preamble has ten formats, as shown in Table 2.

TABLE 2

| Random access preamble format | Sequence length | Subcarrier spacing | Quantity of OFDM symbols |
| --- | --- | --- | --- |
| A0 | 127 or 139 | 15 × 2" kHz | 1 |
| A1 | 127 or 139 | 15 × 2" kHz | 2 |
| A2 | 127 or 139 | 15 × 2" kHz | 4 |
| A3 | 127 or 139 | 15 × 2" kHz | 6 |
| B1 | 127 or 139 | 15 × 2" kHz | 2 |
| B2 | 127 or 139 | 15 × 2" kHz | 4 |
| B3 | 127 or 139 | 15 × 2" kHz | 6 |
| B4 | 127 or 139 | 15 × 2" kHz | 12 |
| C0 | 127 or 139 | 15 × 2" kHz | 1 |
| C2 | 127 or 139 | 15 × 2" kHz | 4 |

Herein, u=1, 2 or 3. In addition, bandwidth allocation of a random access resource corresponding to the random access preamble and a quantity of guard subcarriers are further defined in the NR communications system, as shown in Table 3.

TABLE 3

| Sequence length | Subcarrier spacing on a random access channel | Uplink subcarrier spacing | Quantity of RBs allocated to a random access signal | Quantity of guard subcarriers of a frequency band |
| --- | --- | --- | --- | --- |
| 839 | 1.25 | 15 | 6 | 25 |
| 839 | 1.25 | 30 | 3 | 25 |
| 839 | 1.25 | 60 | 2 | 313 |
| 839 | 5 | {15, 30, 60} | {24, 12, 6} | 25 |
| 139 | 15 | {15, 30} | {12, 6} | 5 |
| 139 | 15 | 60 | 3 | 5 |

TABLE 3-continued

| Sequence length | Subcarrier spacing on a random access channel | Uplink subcarrier spacing | Quantity of RBs allocated to a random access signal | Quantity of guard subcarriers of a frequency band |
|---|---|---|---|---|
| 139 | 30 | {15, 30, 60} | {24, 12, 6} | 5 |
| 139 | 60 | {60, 120} | {12, 6} | 5 |
| 139 | 120 | {60, 120} | {24, 12} | 5 |

Although the random access preamble having a plurality of formats and sizes of allocated bandwidths have been defined in the NR communications system, there is no suitable method for determining a frequency position of the random access resource. To resolve the foregoing problem, an embodiment of the present invention provides a random access signal sending method, including: determining, by a terminal device, a frequency position of a random access resource based on at least one of an initial frequency offset, a random access resource configuration period, an uplink channel bandwidth, a time period of a random access resource, a time period of the random access resource, and a frequency index of the random access resource that are configured by a network device. In this way, the terminal device is prevented from shooting in the dark on a frequency position of a random access resource, and further, the network device can receive the random access signal on the corresponding random access resource, thereby improving efficiency of a random access process.

It should be understood that, the described configuring information by the network device may be configuring a piece of index information, and looking up a table based on an index to obtain specific information, or may be directly configuring a piece of specific information.

Figure 2A:
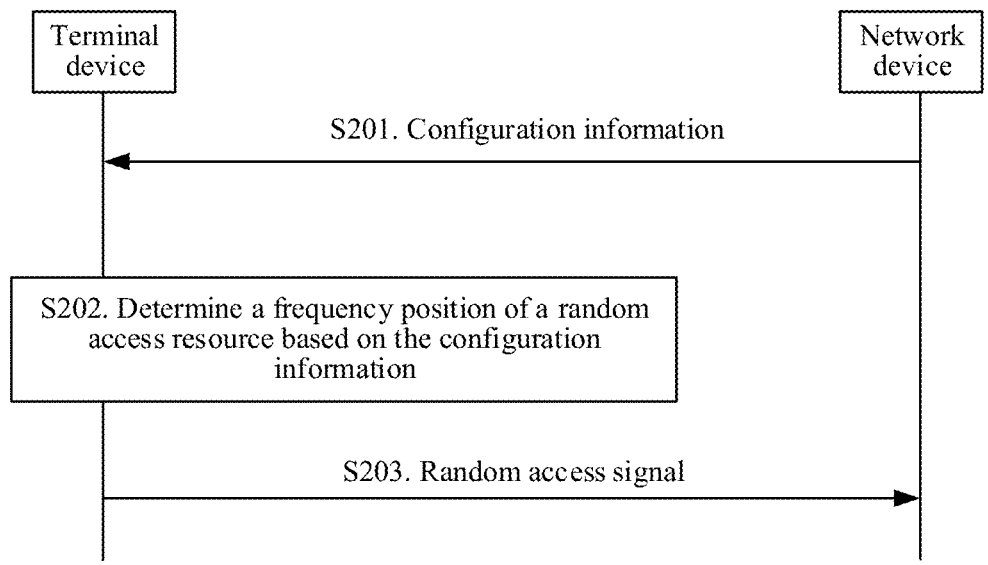
FIG. 2a is a schematic flowchart of a random access signal sending method according to an embodiment of the present invention.

FIG. 2a is a schematic flowchart of a random access signal sending method according to an embodiment of the present invention. In this embodiment of the present invention, the method includes the following steps.

S201. A network device sends configuration information to a terminal device, and the terminal device receives the configuration information from the network device.

Specifically, the configuration information includes at least one of an initial frequency offset, a random access resource configuration period, an uplink channel bandwidth, a bandwidth of a random access resource, a time period of a random access resource, a time period of the random access resource, and a frequency index of the random access resource. The random access resource is a time-frequency resource used for transmitting a random access preamble. The random access resource occupies a particular time in time domain and occupies a particular bandwidth in frequency domain. A random access resource configuration pattern represents distribution of time periods and frequency positions of all available random access resources in a specified time-frequency resource set. The random access resource configuration period is a time length within which the time-frequency resource set periodically recurs, and the random access resource configuration period may be represented through a quantity of system frames, subframes, slots, or OFDM symbols. The random access resource configuration pattern periodically recurs. The uplink channel bandwidth represents a system bandwidth used by the terminal device to perform uplink sending, and a size of the uplink channel bandwidth may be represented through a quantity of RBs. The bandwidth of the random access resource represents a size of a frequency resource occupied by the random access resource in frequency domain, and the bandwidth may be represented through a quantity of RBs. The time period of the random access resource represents a time length occupied by the random access resource in time domain, and the time length may be represented through a quantity of subframes, slots, or OFDM symbols. Also, the time period of the random access resource represents an absolute time position of the random access resource, including a system frame number, a subframe number in a system frame, a slot number in a subframe, an OFDM symbol in a slot, or a time position in an OFDM symbol (where a basic time unit is used as a granularity); or represents a relative position of the random access resource within the random access resource configuration period, to be specific, the random access resource exists on T time positions within the random access resource configuration period, where the time period of the random access resource refers to relative positions 0, 1, . . . , and T−1. The frequency index of the random access resource represents an index of the random access resource in frequency domain.

The terminal device may be directly notified by the network device of values of various parameters in the configuration information, or the network device sends indexes of the parameters to the terminal device. The parameters in the configuration information may be carried in one message, or may be carried in a plurality of messages. For example, the network device sends a time period of the random access resource through at least one of RRC signaling, SI, RMSI, NR SIB1, MAC CE signaling, DCI (downlink control information), a PBCH, and a PDCCH order. The time period of the random access resource may be an absolute time, or may be an index of the time period (for example, a system frame number, a subframe number in a system frame, a slot number in a subframe, or an OFDM symbol in a slot).

For the random access resource configuration pattern, a time length of the random access resource configuration pattern is K slots in a subcarrier spacing corresponding to the random access preamble, where K is a positive integer. Optionally, the time length of the random access resource configuration pattern is determined based on at least one actually transmitted downlink signal. When the at least one actually transmitted downlink signal is larger and more random access resources are associated with the at least one actually transmitted downlink signal, the time length of the random access resource configuration pattern is longer. Otherwise, an actual length of the random access resource configuration pattern is shorter. Optionally, the random access resource configuration period is at least one of 0.125 ms, 0.25 ms, 0.5 ms, 2 ms, 1 ms, 5 ms, 10 ms, 20 ms, 40 ms, 80 ms, 160 ms, and 320 ms, where 0.125 ms is one slot corresponding to 120 kHz, 0.25 ms is one slot corresponding to 60 kHz or two slots corresponding to 120 kHz. The network device may directly notify the terminal device of the time length of the random access resource configuration period, for example, directly notify the terminal device of 0.125 ms. Also, the network device may notify the terminal device of an index of the time length. For example, an index of 0.125 ms is 1, an index of 0.25 ms is 2, and so on. When the network device configures the time length of the random access resource configuration period as 0.125 ms, the network device notifies the terminal device of the index 1 of 0.125 ms. Optionally, the random access resource configuration period and the time length of the random access resource configuration pattern are both configured by the network device. Optionally, the random access resource configuration period and the time length of the random access resource configuration pattern are separately obtained based on a random access resource configuration index. Optionally, the random access resource configuration period is obtained based on a random access resource configuration index, and the time length of the random access resource configuration pattern is obtained based on the configuration information of the network device. Optionally, the time length of the random access resource configuration pattern is obtained based on a random access resource configuration index, and the random access resource configuration period is obtained based on the configuration information of the network device.

The configuration information may be indicated through at least one of RRC (Radio Resource Control) signaling, SI (system information), RMSI (remaining minimum system information), NR SIB1 (new radio system information block type 1), MAC CE (media access control-control element) signaling, DCI (downlink control information), a PBCH (physical broadcast channel), and a PDCCH order (physical downlink control channel order).

Figure 2B:
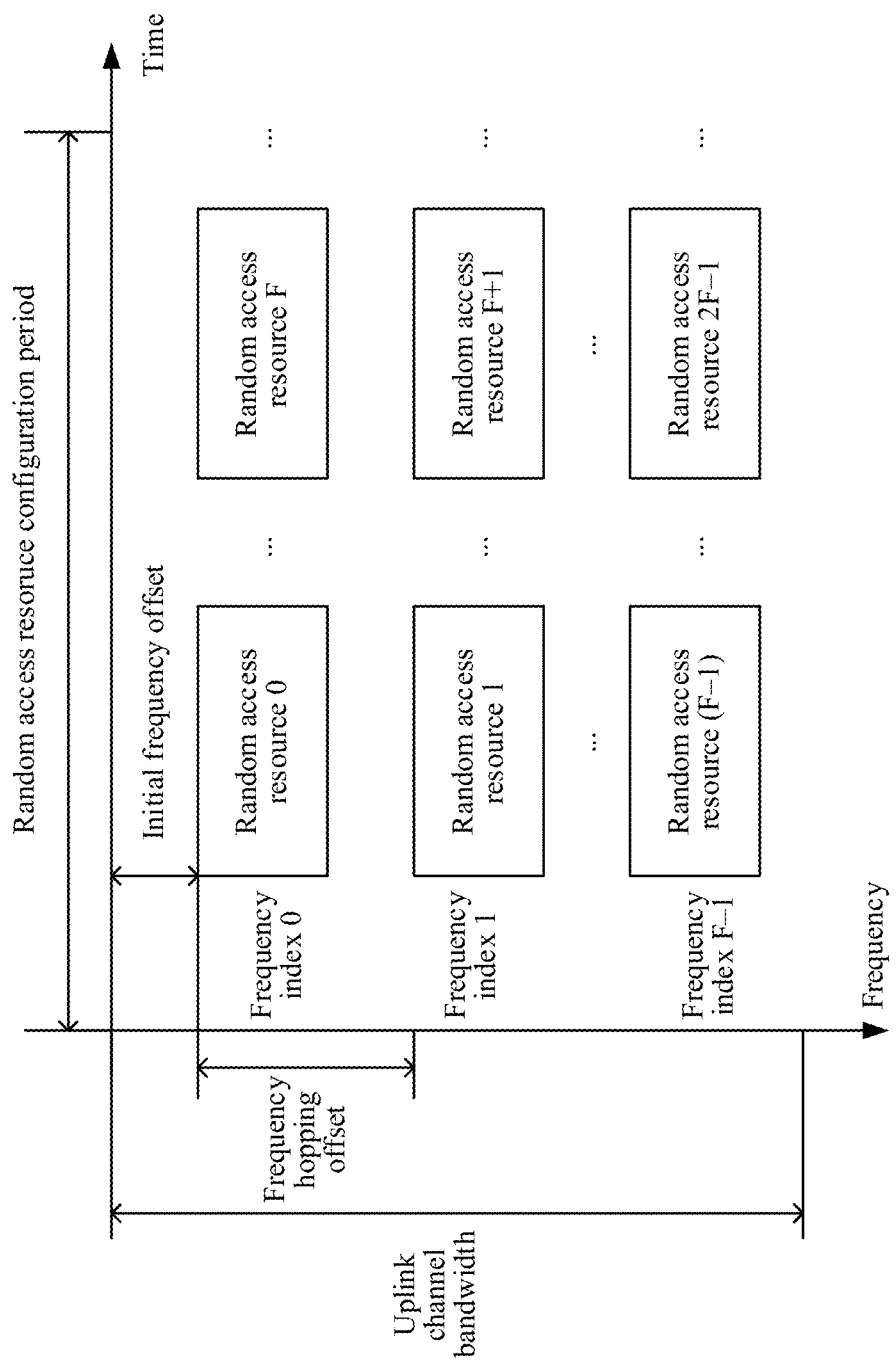
FIG. 2b is a schematic diagram of a random access resource configuration pattern according to an embodiment of the present invention.

For example, FIG. 2b is a schematic diagram of a random access resource configuration pattern according to an embodiment of the present invention. The random access resource configuration pattern represents position distribution of all available random access resources in a time-frequency resource set including the random access resource configuration period and the uplink channel bandwidth. All the available random access resources in the time-frequency resource set corresponding to the random access resource configuration pattern (hereinafter briefly referred to as a time-frequency resource set) are numbered according to a specific rule, where a number of each random access resource is an index of the random access resource, and the random access resources correspond to different indexes. The numbering rule of the random access resources in the time-frequency resource set may be: first frequency domain and then time domain (a numbering method shown in FIG. 2b), or first time domain and then frequency domain. Also, numbering is performed in another manner. Each random access resource in the time-frequency resource set corresponds to one index in frequency domain (that is, a frequency index of the random access resource). A method for numbering the random access resources in frequency domain may be: performing incremental numbering at a fixed step based on frequency magnitude, or performing decremental numbering at a fixed step based on frequency magnitude, or performing numbering in another manner. This is not limited in this embodiment. The initial frequency offset is a frequency position of an initial available random access resource (a random access resource whose index is 0) in the time-frequency resource set, for example, the frequency position is represented through a difference between a starting frequency of the random access resource 0 and a minimum frequency of the uplink channel bandwidth. For another example, the initial frequency offset is fixed to 0. In this case, the network device does not need to notify the terminal device. For another example, for a rule of numbering indexes and frequency indexes of the random access resources, refer to FIG. 2c, where F is an even number greater than 1.

In a possible implementation, the configuration information further includes a frequency hopping offset.

Specifically, the frequency hopping offset represents a frequency offset between two random access resources adjacent to each other within a same time period in a time-frequency resource set corresponding to the random access resource. For example, referring to FIG. 2b, the frequency hopping offset represents a frequency offset between the random access resource 0 and a random access resource 1. It may be understood that frequency hopping offsets between any two random access resources that are adjacent to each other in the time-frequency resource set in frequency domain are equal.

In a possible implementation, the network device may indicate the initial frequency offset $f_{start}$ and/or the frequency hopping offset $f_{offset}$ based on the following system information (SI):

prach-FreqOffset INTEGER(0, ..., N1)optional
prach-HoppingOffset INTERGER(0, ..., N2)optional
where prach-FreqOffset is the initial frequency offset with a value range of 0 to N1; and prach-HoppingOffset is the frequency hopping offset with a value range of 0 to N2, where both N1 and N2 are positive integers.

In another possible implementation, the frequency hopping offset $f_{offset}$ is determined based on indication information of the network device and/or at least one of the bandwidth $N_{RA}$ of the random access resource, a subcarrier spacing $SCS_{BWP}$ of an initial active uplink band, and a subcarrier spacing $SCS_{UL}$ of the uplink channel bandwidth. For example, when the indication information of the network device is X, $f_{offset}=X \times N_{RA}$, $f_{offset}=N_{RA} \times \lfloor N_{RB}/X \rfloor$, $f_{offset}=X \times SCS_{BWP}$, or $f_{offset}=X \times SCS_{UL}$.

S202. The terminal device determines a frequency position of the random access resource based on the configuration information.

Specifically, the frequency position of the random access resource represents an absolute position of the random access resource in frequency domain, the frequency position of the random access resource uses an RB or an RB group as a granularity, and a starting frequency of the random access resource is aligned with a starting frequency of an RB. For example, when a bandwidth of the random access resource is a fixed value, the frequency position of the random access resource may be represented through a frequency position of a starting RB or a frequency position of a middle RB of the random access resource.

In a possible implementation, the terminal device determines the frequency position of the random access resource based on the initial frequency offset, the time period of the random access resource, the random access resource configuration period, the bandwidth of the random access resource, the uplink channel bandwidth, and a value N configured by the network device or a standard preset constant N. For example, when N=2, the frequency position of the random access resource may be determined based on the following first formula.

First Formula:

when $\lfloor t_{RA}/T_{RA} \rfloor \mod 2=0$, $F_{RB}=f_{start}+N_{RA} \times f_{RA}$; or when $\lfloor t_{RA}/T_{RA} \rfloor \mod 2=1$, $F_{RB}=(f_{start}+f_{offset}+N_{RA} \times f_{RA}) \mod N_{RB}$, where $\lfloor \ \rfloor$ represents a rounding down operator; mod represents a modulo operator; $F_{RB}$ is the frequency position of the random access resource; $f_{start}$ is the initial frequency offset; $T_{RA}$ is the random access resource configuration period; $N_{RB}$ is the uplink channel bandwidth, may be understood as a channel bandwidth in which an uplink random access process is performed, and may be an initial active uplink bandwidth part (initial active uplink bandwidth part); $N_{RA}$ is the bandwidth of the random access resource; $t_{RA}$ is the time period of the random access resource; and $f_{RA}$ is the frequency index of the random access resource. As shown in the following figure, in another implementation, the initial frequency offset $f_{start}$ is fixed to 0, and does not need to be configured.

Figure 2C:
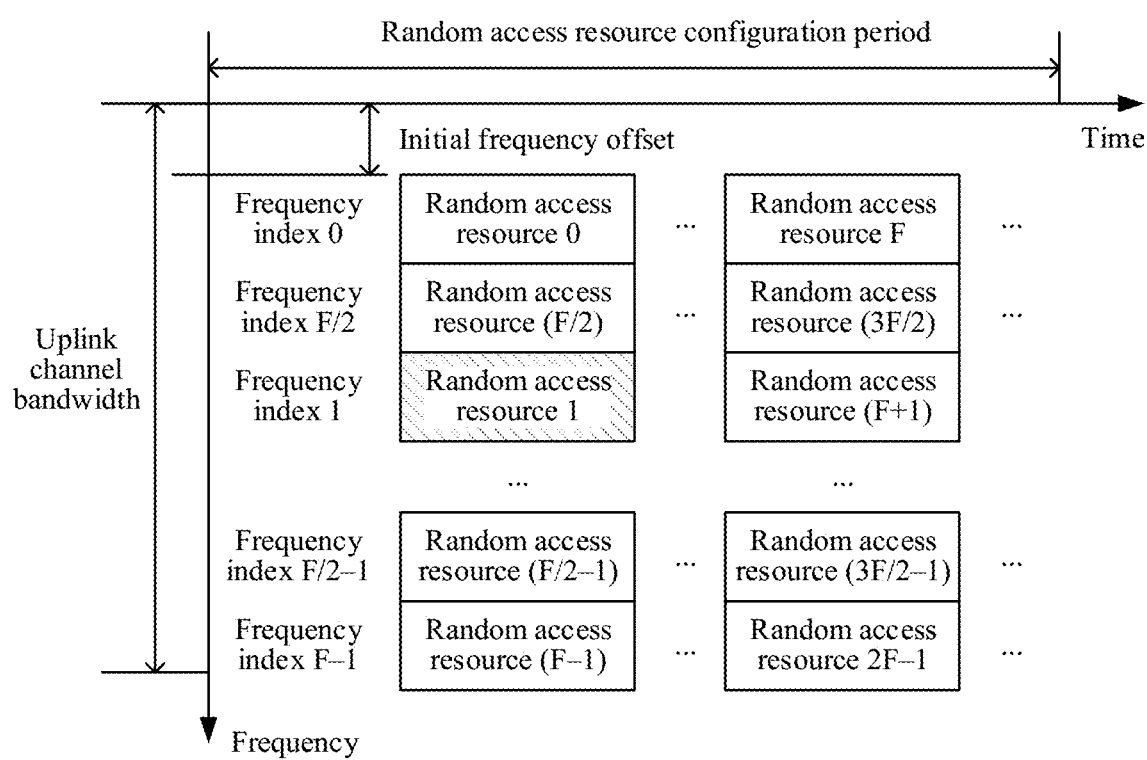
FIG. 2c is another schematic diagram of a random access resource configuration pattern according to an embodiment of the present invention.
Figure 2D:
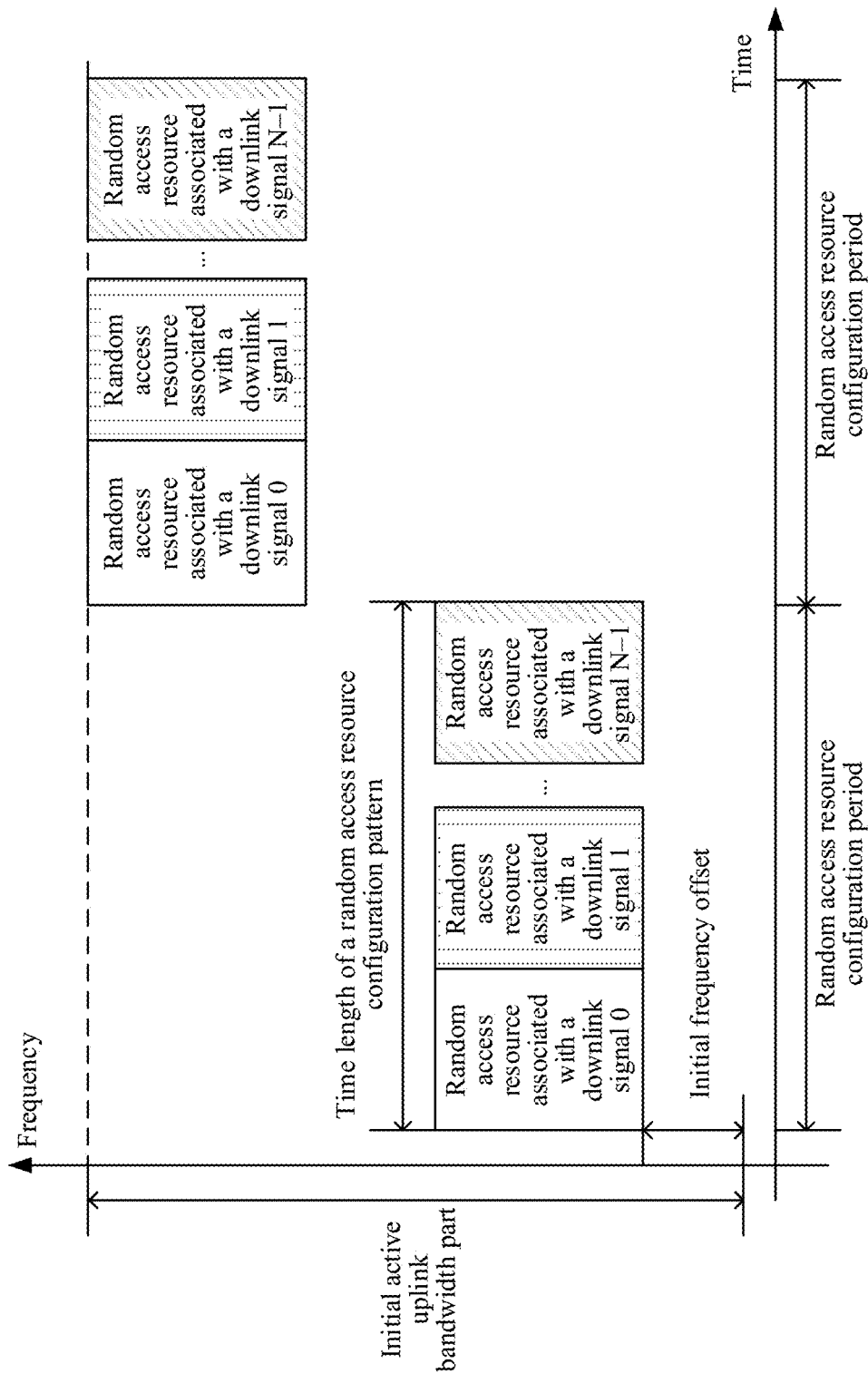
FIG. 2d is a schematic diagram of frequency hopping sending according to an embodiment of the present invention.

FIG. 2*d* shows a frequency hopping manner according to an embodiment of the present invention. The terminal device sends random access signals within different random access resource configuration periods through frequency hopping. FIG. 2*c* may show another manner of sending a random access signal through frequency hopping. The terminal device performs frequency hopping sending within a random access time, to be specific, performs frequency hopping by selecting a frequency with a step size of 1 based on a frequency index 0, a frequency index 1, a frequency index 2, and the like. Optionally, the terminal device may also perform frequency hopping sending within a subframe, perform frequency hopping sending within a semi-static uplink or downlink UL/DL period, or perform frequency hopping sending within a slot. This is not limited in this embodiment. Optionally, the frequency hopping manners in FIG. 2*c* and FIG. 2*d* may be combined.

In this embodiment of the present invention, $T_{RA}$ may be understood as the absolute time length of the random access resource configuration period. In this case, $t_{RA}$ may be understood as the absolute time of the random access resource. Also, $T_{RA}$ may be understood as a quantity of random access resources in time within the random access resource configuration period. In this case, $t_{RA}$ may be understood as an index of a relative time or a logical time of the random access resource within N random access resource configuration periods. Also, $T_{RA}$ may be understood as a quantity of random access resources in time and frequency within the random access resource configuration period. In this case, $t_{RA}$ may be understood as an index of a relative or logical resource of the random access resource within N random access resource configuration periods, where N>1. For example, $T_{RA}$ and/or $t_{RA}$ are one or more indexes of an absolute time or a logical time within a frame, a subframe, a slot, or an OFDM symbol.

In another possible implementation, the terminal device determines the frequency position of the random access resource based on the time period of the random access resource, the random access resource configuration period, the frequency index of the random access resource, the initial frequency offset, the uplink channel bandwidth, the bandwidth of the random access resource, and a value N configured by the network device or a preset constant N. For example, when N=2, the frequency position of the random access resource may be determined based on the following second formula.

Second formula:

when $\lfloor t_{RA}/T_{RA} \rfloor \bmod 2=0$ and $f_{RA} \bmod 2=0$,
$F_{RB}=f_{start}+N_{RA}\times\lfloor f_{RA}/2 \rfloor$;

when $\lfloor t_{RA}/T_{RA} \rfloor \bmod 2=0$ and $f_{RA} \bmod 2=1$,
$F_{RB}=N_{RB}-f_{start}-N_{RA}\times(\lfloor f_{RA}/2 \rfloor+1)$;

when $\lfloor t_{RA}/T_{RA} \rfloor \bmod 2=1$ and $f_{RA} \bmod 2=0$,
$F_{RB}=N_{RB}-f_{start}-N_{RA}\times(\lfloor f_{RA}/2 \rfloor+1)$; or when $\lfloor t_{RA}/T_{RA} \rfloor \bmod 2=1$ and $f_{RA} \bmod 2=1$,
$F_{RB}=f_{start}+N_{RA}\times\lfloor f_{RA}/2 \rfloor$, where $\lfloor\ \rfloor$ represents a rounding down operator, mod represents a modulo operator, $F_{RB}$ is the frequency position of the random access resource, $f_{start}$ is the initial frequency offset, $T_{RA}$ is the random access resource configuration period, $N_{RB}$ is the uplink channel bandwidth, $N_{RA}$ is the bandwidth of the random access resource, $t_{RA}$ is the time period of the random access resource, and $f_{RA}$ is the frequency index of the random access resource.

In another possible implementation, the terminal device determines the frequency position of the random access resource based on the time period of the random access resource, the random access resource configuration period, the bandwidth of the random access resource, the initial frequency offset, the frequency index of the random access resource, the frequency hopping offset, and a value N configured by the network device or a preset constant N. For example, when N=2, the frequency position of the random access resource may be determined based on the following third formula.

Third Formula:

when $\lfloor t_{RA}/T_{RA} \rfloor \bmod 2=0$, $F_{RB}=f_{start}+N_{RA}\times f_{RA}$; or when $\lfloor t_{RA}/T_{RA} \rfloor \bmod 2=1$, $F_{RB}=(f_{start}+f_{offset}+N_{RA}\times f_{RA}) \bmod N_{RB}$, where $\lfloor\ \rfloor$ represents a rounding down operator, mod represents a modulo operator, $F_{RB}$ is the frequency position of the random access resource, $f_{start}$ is the initial frequency offset, $T_{RA}$ is the random access resource configuration period, $N_{RB}$ is the uplink channel bandwidth, $N_{RA}$ is the bandwidth of the random access resource, $t_{RA}$ is the time period of the random access resource, $f_{RA}$ is the frequency index of the random access resource, and $f_{offset}$ is the frequency hopping offset.

In this embodiment of the present invention, the frequency index $f_{RA}$ of the random access resource may be understood as a logical frequency index of the random access resource in time. $f_{RA}$ is in a one-to-one correspondence with a physical frequency of the random access resource. In a possible implementation, $f_{RA}$ increases with an increasing quantity of physical frequency positions of the random access resource. In another implementation, the physical frequency position corresponding to the random access resource whose index is $f_{RA}$ is determined based on a preset rule, a pattern, and a formula. In an implementation, $f_{RA}$ is an index of an uplink carrier frequency, an uplink channel bandwidth, an initial access uplink channel bandwidth part, or a logical frequency of an uplink channel bandwidth part. For example, $f_{RA}$ is an index of an initial access uplink channel bandwidth part of the random access resource. For another example, $f_{RA}$ is an index of at least one initial access uplink channel bandwidth part in an uplink carrier of the random access resource, to be specific, if the uplink carrier (and/or a corresponding uplink channel bandwidth) includes a plurality of initial access uplink channel bandwidth parts, random access resources on the plurality of initial access uplink channel bandwidth parts may be indexed together. For another example, $f_{RA}$ is an index of at least one initial access uplink channel bandwidth part in an uplink carrier of the random access resource, to be specific, if the uplink carrier or an uplink channel bandwidth includes a plurality of initial access uplink channel bandwidth parts, random access resources on the plurality of initial access uplink channel bandwidth parts may be indexed together. For another example, there are a plurality of uplink carriers in a cell, and $f_{RA}$ is a logical frequency index of each of all uplink random access resources.

In this embodiment of the present invention, if the random access resource has only one frequency, that is, the index $f_{RA}=0$, it may be considered that the frequency position of the random access resource is determined without using the index.

In another possible implementation, the configuration information further includes a mapping relationship between at least one actually sent downlink signal and a random access resource in a random access resource configuration pattern.

Figure 2E:
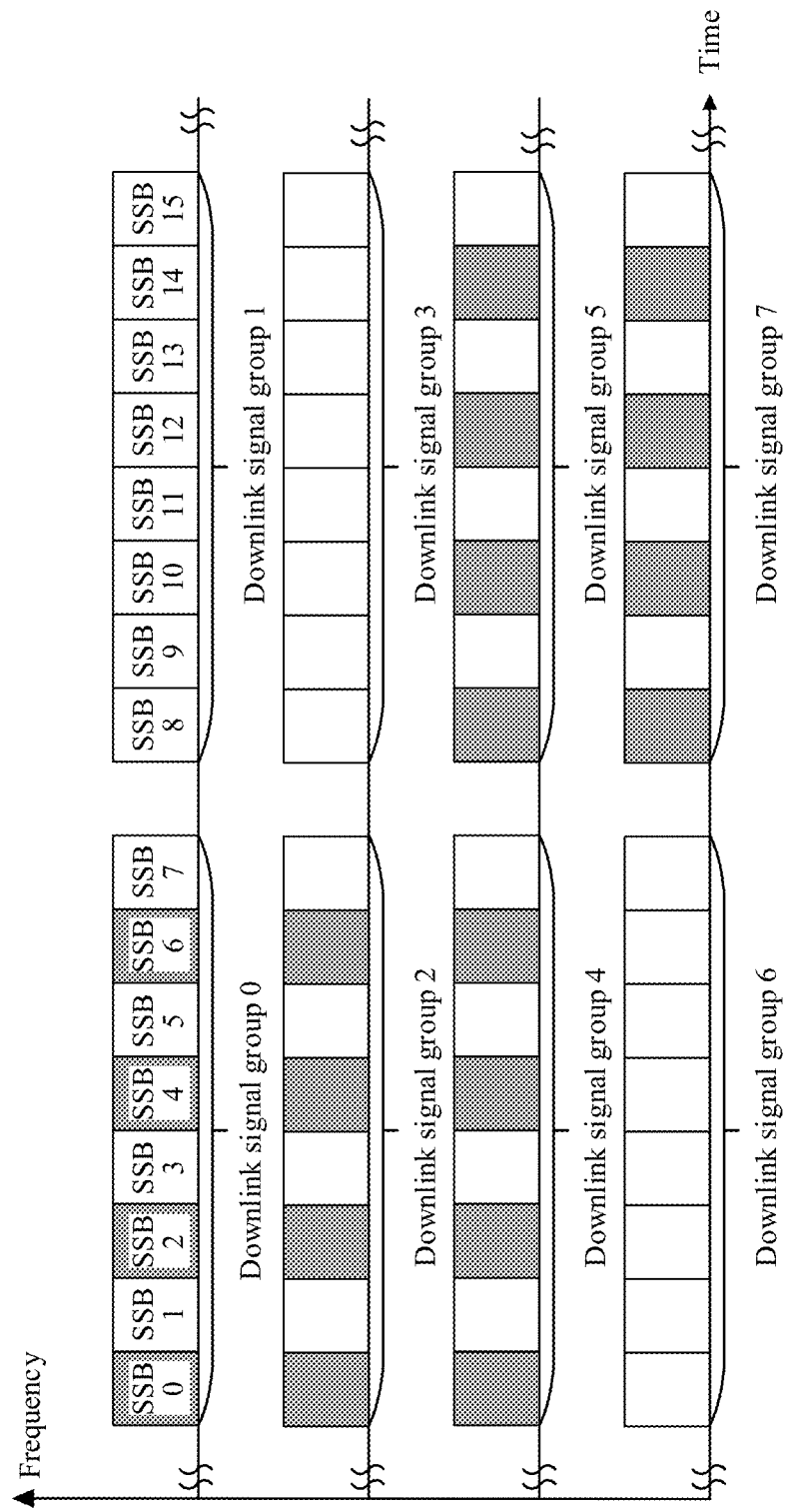
FIG. 2e is a position distribution diagram of sending a downlink signal according to an embodiment of the present invention.

Specifically, the actually sent downlink signal is a signal used by the network device to perform downlink synchronization sending, and the downlink signal includes but is not limited to any one of an SS/PBCH block, a DMRS, and a CSI-RS. FIG. 2e is a position distribution diagram of downlink signals actually sent by the network device. The downlink signal is an SS/PBCH block, and eight SS/PBCH blocks constitute a downlink signal group. A rectangular box in FIG. 2e represents all available time-frequency resources of the network device that are used to send a downlink signal. It may be learned that, the network device has a total of 64 available time-frequency resources for sending a downlink signal, where a gray rectangular box represents time-frequency resources occupied by the actually sent downlink signals, and there are 16 downlink signals actually sent by the network device.

The SS/PBCH block includes an SS (synchronization signal) and a PBCH, and the SS includes a PSS (primary synchronization signal) and an SSS (secondary synchronization signal). The SS/PBCH block may further have other names, for example, an SS block.

The network device determines the frequency position of the random access resource based on the mapping relationship between the at least one actually sent downlink signal and the random access resource in the random access resource configuration pattern.

Optionally, when the at least one actually sent downlink signal and a plurality of random access resources in the random access resource configuration pattern have a mapping relationship, the terminal device determines the frequency position of the random access resource based on an index of the random access resource, the initial frequency offset, the frequency index of the random access resource, the uplink channel bandwidth, and the bandwidth of the random access resource, and for example, determines the frequency position of the random access resource based on the following fourth formula.

Fourth Formula:

$$\text{when } n_{RO} \bmod 2=0, F_{RB}=f_{start}+N_{RA} \times f_{RA}^{RO}; \text{ or}$$

$$\text{when } n_{RO} \bmod 2=1, F_{RB}=N_{RB}-f_{start}-N_{RA} \times (f_{RA}^{RO}+1),$$

where mod represents a modulo operator, $F_{RB}$ is the frequency position of the random access resource, $f_{start}$ is the initial frequency offset, $f_{offset}$ is the frequency hopping offset, $n_{RO}$ is the index of the random access resource, $t_{RA}^{RO}$ represents the time period of the random access resource, and may be represented through a quantity of slots, subframes, or OFDM symbols, $f_{RA}^{RO}$ is the frequency index of the random access resource, $N_{RA}$ is the bandwidth of the random access resource, and $N_{RB}$ represents the uplink channel bandwidth, which, for example, is represented through a quantity of RBs.

Also, the terminal device determines the frequency position of the random access resource based on the initial frequency offset, the time period of the random access resource, the frequency hopping offset, the bandwidth of the random access resource, the frequency index of the random access resource, and the uplink channel bandwidth, and for example, determines the frequency position of the random access resource based on the following fifth formula.

Fifth Formula:

$$F_{RB}=(f_{start}+t_{RA}^{RO} \times f_{offset}+N_{RA} \times f_{RA}^{RO}) \bmod N_{RB}, \text{ where}$$

mod represents a modulo operator, $F_{RB}$ is the frequency position of the random access resource, $f_{start}$ is the initial frequency offset, $n_{RO}$ is an index of the random access resource, $t_{RA}^{RO}$ is the time period of the random access resource, and may be represented through a quantity of slots, subframes, or OFDM symbols, $f_{offset}$ represents the frequency hopping offset, $N_{RA}$ is the bandwidth of the random access resource, and $N_{RB}$ represents the uplink channel bandwidth, which, for example, is represented through a quantity of RBs.

Also, the terminal device determines the frequency position of the random access resource based on the time period of the random access resource, the initial frequency offset, the bandwidth of the random access resource, the frequency index of the random access resource, and the uplink channel bandwidth, and for example, determines the frequency position of the random access resource based on the following sixth formula.

Sixth Formula:

$$\text{when } t_{RA}^{RO} \bmod 2=0, F_{RB}=f_{start}+N_{RA} \times f_{RA}^{RO}; \text{ or}$$

$$\text{when } t_{RA}^{RO} \bmod 2=1, F_{RB}=N_{RB}-f_{start}-N_{RA} \times (f_{RA}^{RO}+1), \text{ where}$$

mod represents a modulo operator, $F_{RB}$ is the frequency position of the random access resource, $f_{start}$ is the initial frequency offset, $n_{RO}$ is an index of the random access resource, $t_{RA}^{RO}$ represents the time period of the random access resource, and may be represented through a quantity of slots, subframes, or OFDM symbols, $f_{RA}^{RO}$ is the frequency index of the random access resource, $N_{RA}$ is the bandwidth of the random access resource, and $N_{RB}$ represents the uplink channel bandwidth, which, for example, is represented through a quantity of RBs.

Also, the terminal device determines the frequency position of the random access resource based on the time period of the random access resource, the initial frequency offset, the frequency index of the random access resource, the frequency hopping offset, and the uplink channel bandwidth, and for example, determines the frequency position of the random access resource based on the following seventh formula.

Seventh Formula:

$$\text{when } t_{RA}^{RO} \bmod 2=0, F_{RB}=f_{start}+N_{RA} \times f_{RA}^{RO}; \text{ or}$$

$$\text{when } t_{RA}^{RO} \bmod 2=1, F_{RB}=(f_{start}+t_{RA}^{RO}+f_{offset}+N_{RA} \times f_{RA}^{RO}) \bmod N_{RB}, \text{ where}$$

mod represents a modulo operator, $F_{RB}$ is the frequency position of the random access resource, $f_{start}$ is the initial frequency offset, $f_{offset}$ is the frequency hopping offset, $n_{RO}$ is an index of the random access resource, $t_{RA}^{RO}$ represents the time period of the random access resource, and may be represented through a quantity of slots, subframes, or OFDM symbols, $f_{RA}^{RO}$ is the frequency index of the random access resource, $N_{RA}$ is the bandwidth of the random access resource, and $N_{RB}$ represents the uplink channel bandwidth, which, for example, is represented through a quantity of RBs.

For another example, when the at least one actually sent downlink signal and a random access resource in the random access resource configuration pattern have a mapping relationship, the terminal device determines the frequency position of the random access resource based on any one of the foregoing first to third formulas.

In a possible implementation, the frequency position of the random access resource is determined based on a format of the random access preamble and the at least one actually transmitted downlink signal.

Specifically, when the random access preamble has a length of 839, the random access preamble is defined to have four formats, which are a format 0 to a format 3 respectively. When the random access preamble has a length of 127 or 139, the random access preamble is defined to have ten formats, which are A0, A1, A2, A3, B1, B2, B3, B4, C0, and C2 respectively.

For example, when the format of the random access preamble is any one of A0, A1, B1, and C0, the terminal device determines the frequency position of the random access resource based on the first formula or the second formula. When the format of the random access preamble is none of A0, A1, B1, and C0, the terminal device determines the frequency position of the random access resource based on the third formula.

For another example, when the format of the random access preamble is any one of A0, A1, B1, and C0, and the quantity of actually sent downlink signals is less than or equal to M, the terminal device determines the frequency position of the random access resource based on the first formula or the second formula. Otherwise, the terminal device determines the frequency position of the random access resource based on the third formula. M is an integer greater than 0, and a value of M may be configured by the network device, or may be a predefined value.

In this embodiment of the present invention, the index $n_{RO}$ of the random access resource may be a logical index of the random access resource in the random access resource configuration period or in a random access resource configuration pattern of the random access resource configuration period. The index $n_{RO}$ of the random access resource may also be an absolute time or a frequency index of the random access resource in the random access resource configuration period or in a random access resource configuration pattern of the random access resource configuration period. The index $n_{RO}$ of the random access resource may also be jointly represented by the frequency index $f_{RA}$ of the random access resource and the time index $t_{RA}$ of the random access resource.

In a possible implementation, the frequency position of the random access resource is determined based on a frame structure type or a duplex mode.

Specifically, frame structures used by the terminal device include a TDD (time division duplex) frame or an FDD (frequency division duplex) frame. The duplex mode includes full duplex, time division duplex, or frequency division duplex.

For example, when the terminal device uses the FDD frame or the frequency division duplex to send the random access signal, the terminal device determines the frequency position of the random access resource based on the first formula or the second formula. When the terminal device uses the TDD frame or the time division duplex to send the random access signal, the terminal device determines the frequency position of the random access resource based on the third formula. When the terminal device uses the full duplex to send the random access signal, the terminal device determines the frequency position of the random access resource based on the sixth formula.

In an implementation, the terminal device determines the frequency position of the random access resource based on the time period of the random access resource, uplink/downlink configuration information, the initial frequency offset, the bandwidth of the random access resource, the frequency index of the random access resource, and the uplink channel bandwidth. The uplink/downlink configuration information includes at least one of an uplink slot, a downlink slot, information about a quantity of undetermined slots, and period information $T_{DL/UL}$. For example, the frequency position of the random access resource is determined based on the following eighth formula.

Eighth Formula:

when $\lfloor t_{RA}/T_{DL/UL} \rfloor$ mod 2=0, $F_{RB}=f_{start}+N_{RA}\times f_{RA}$; or when $\lfloor t_{RA}/T_{DL/UL} \rfloor$ mod 2=1, $F_{RB}=N_{RB}-f_{start}-N_{RA}\times (f_{RA}+1)$, where $\lfloor \ \rfloor$ represents a rounding down operator, mod represents a modulo operator, $F_{RB}$ is the frequency position of the random access resource, $f_{start}$ is the initial frequency offset, $T_{DL/UL}$ represents the uplink/downlink configuration information, $N_{RA}$ is the bandwidth of the random access resource, $N_{RB}$ represents the uplink channel bandwidth, which, for example, is represented through a quantity of RBs, $t_{RA}$ represents the time period of the random access resource, and $f_{RA}$ is the frequency index of the random access resource.

In a possible implementation, the terminal device determines the frequency position of the random access resource based on the time period of the random access resource, uplink/downlink configuration information, the frequency index of the random access resource, the initial frequency offset, and the bandwidth of the random access resource, and for example, determines the frequency position of the random access resource based on the following ninth formula.

Ninth Formula:

when $\lfloor t_{RA}/T_{DL/UL} \rfloor$ mod 2=0 and $f_{RA}$ mod 2=0, $F_{RB}=f_{start}+N_{RA}\times \lfloor f_{RA}/2 \rfloor$;

when $\lfloor t_{RA}/T_{DL/UL} \rfloor$ mod 2=1 and $f_{RA}$ mod 2=1, $F_{RB}=N_{RB}-f_{start}-N_{RA}\times (\lfloor f_{RA}/2 \rfloor+1)$;

when $\lfloor t_{RA}/T_{DL/UL} \rfloor$ mod 2=0 and $f_{RA}$ mod 2=0, $F_{RB}=N_{RB}-f_{start}-N_{RA}\times (\lfloor f_{RA}/2 \rfloor+1)$; or when $\lfloor t_{RA}/T_{DL/UL} \rfloor$ mod 2=1, and $f_{RA}$ mod 2=1, $F_{RB}=f_{start}+N_{RA}\times \lfloor f_{RA}/2 \rfloor$, where mod represents a modulo operator, $\lfloor \ \rfloor$ represents a rounding down operator, $F_{RB}$ is the frequency position of the random access resource, $f_{start}$ is the initial frequency offset, $T_{DL/UL}$ represents the uplink/downlink configuration information, $N_{RA}$ is the bandwidth of the random access resource, $N_{RB}$ represents the uplink channel bandwidth, which, for example, is represented through a quantity of RBs, $t_{RA}$ represents the time period of the random access resource, and $f_{RA}$ is the frequency index of the random access resource.

In a possible implementation, the terminal device determines the frequency position of the random access resource based on the time period of the random access resource, uplink/downlink configuration information, the initial frequency offset, the bandwidth of the random access resource, the frequency index of the random access resource, the frequency hopping offset, and the uplink channel bandwidth, and for example, determines the frequency position of the random access resource based on the following tenth formula.

Tenth Formula:

when $\lfloor t_{RA}/T_{DL/UL} \rfloor$ mod 2=0, $F_{RB}=f_{start}+N_{RA}\times f_{RA}$; or when $\lfloor t_{RA}/T_{DL/UL} \rfloor$ mod 2=1, $F_{RB}=(f_{start}+f_{offset}+N_{RA}\times f_{RA})$ mod $N_{RB}$, where mod represents a modulo operator, $\lfloor \ \rfloor$ represents a rounding down operator, $F_{RB}$ is the frequency position of the random access resource, $f_{start}$ is the initial frequency offset, $T_{DL/UL}$ represents the uplink/downlink configuration information, $N_{RA}$ is the bandwidth of the random access resource, $N_{RB}$ represents the uplink channel bandwidth, which, for example, is represented through a quantity of RBs, $t_{RA}$ represents the time period of the random access resource, $f_{RA}$ is the frequency index of the random access resource, and $f_{offset}$ is the frequency hopping offset.

In an implementation, the terminal device determines the frequency position of the random access resource based on the time period of the random access resource, a time period configured by the network device or a preset time period, the initial frequency offset, the bandwidth of the random access resource, and the frequency index of the random access resource. The time period T configured by the network device or the preset time period T is an absolute time, to be specific, a quantity of OFDM symbols, a quantity of slots, a quantity of subframes, a quantity of frames, and a quantity of milliseconds, such as 0.125 ms, 0.25 ms, 0.5 ms, 2 ms, 1 ms, 5 ms, 10 ms, 20 ms, 40 ms, 80 ms, 160 ms, and 320 ms. Optionally, T is a quantity of random access resources in a random access resource configuration pattern, or T is a quantity of downlink signals associated with the random access resource. For example, the terminal device determines the frequency position of the random access resource based on the following eleventh formula.

Eleventh Formula:

when $\lfloor t_{RA}/T \rfloor$ mod 2=0, $F_{RB} = f_{start} + N_{RA} \times f_{RA}$; or when $\lfloor t_{RA}/T \rfloor$ mod 2=1, $F_{RB} = N_{RB} - f_{start} - N_{RA} \times (f_{RA} + 1)$, where mod represents a modulo operator, $\lfloor \ \rfloor$ represents a rounding down operator, $F_{RB}$ is the frequency position of the random access resource, $f_{start}$ is the initial frequency offset, T represents the quantity of random access resources in the random access resource configuration pattern, $N_{RA}$ is the bandwidth of the random access resource, $N_{RB}$ represents the uplink channel bandwidth, which, for example, is represented through a quantity of RBs, $t_{RA}$ represents the time period of the random access resource, and $f_{RA}$ is the frequency index of the random access resource.

For another example, the terminal device determines the frequency position of the random access resource based on the following twelfth formula.

Twelfth Formula:

when $\lfloor t_{RA}/T \rfloor$ mod 2=0 and $f_{RA}$ mod 2=0, $F_{RB} = f_{start} + N_{RA} \times \lfloor f_{RA}/2 \rfloor$;

when $\lfloor t_{RA}/T \rfloor$ mod 2=1 and $f_{RA}$ mod 2=1, $F_{RB} = N_{RB} - f_{start} - N_{RA} \times (\lfloor f_{RA}/2 \rfloor + 1)$;

when $\lfloor t_{RA}/T \rfloor$ mod 2=0 and $f_{RA}$ mod 2=0, $F_{RB} = N_{RB} - f_{start} - N_{RA} \times (\lfloor f_{RA}/2 \rfloor + 1)$; or when $\lfloor t_{RA}/T \rfloor$ mod 2=1 and $f_{RA}$ mod 2=1, $F_{RB} = f_{start} + N_{RA} \times \lfloor f_{RA}/2 \rfloor$, where mod represents a modulo operator, $\lfloor \ \rfloor$ represents a rounding down operator, $F_{RB}$ is the frequency position of the random access resource, $f_{start}$ is the initial frequency offset, T represents the quantity of random access resources in the random access resource configuration pattern, $N_{RA}$ is the bandwidth of the random access resource, $N_{RB}$ represents the uplink channel bandwidth, which, for example, is represented through a quantity of RBs, $t_{RA}$ represents the time period of the random access resource, and $f_{RA}$ is the frequency index of the random access resource.

For another example, the terminal device determines the frequency position of the random access resource based on the following thirteenth formula.

Thirteenth Formula:

when $\lfloor t_{RA}/T \rfloor$ mod 2=0, $F_{RB} = f_{start} + N_{RA} \times f_{RA}$; or when $\lfloor t_{RA}/T \rfloor$ mod 2=1, $F_{RB} = (f_{start} + f_{offset} + N_{RA} \times f_{RA})$ mod $N_{RB}$, where mod represents a modulo operator, $\lfloor \ \rfloor$ represents a rounding down operator, $F_{RB}$ is the frequency position of the random access resource, $f_{start}$ is the initial frequency offset, T represents the quantity of random access resources in the random access resource configuration pattern, $N_{RA}$ is the bandwidth of the random access resource, $N_{RB}$ represents the uplink channel bandwidth, which, for example, is represented through a quantity of RBs, $t_{RA}$ represents the time period of the random access resource, $f_{RA}$ is the frequency index of the random access resource, and $f_{offset}$ is the frequency hopping offset.

S203. The terminal device sends a random access signal to the network device, and the network device receives the random access signal from the terminal device.

Specifically, the terminal device selects one random access preamble from a random access preamble set; maps the selected random access preamble to the frequency position of the random access resource determined in S202, to generate a random access signal; and sends the random access signal to the network device. A rule used by the terminal device to select a to-be-sent random access preamble is not limited in this embodiment.

It should be noted that before receiving the random access signal sent by the terminal device, the network device needs to determine the frequency position of the random access resource based on the configuration information. For a method used by the network device to determine the frequency position of the random access resource based on the configuration information, refer to the method that is used by the terminal device to determine the frequency position of the random access resource based on the configuration information and that is described in S202. Details are not described herein again.

It should be noted that some parameters may be obtained based on other parameters. For example, the random access resource configuration period, the format of the random access preamble, a subcarrier spacing of the random access preamble, and the bandwidth of the random access resource may be obtained based on at least one of the index of the random access resource and a subcarrier spacing of a message 3. For another example, the bandwidth of the random access resource may be determined based on at least one of the format of the random access preamble, a subcarrier spacing of the random access preamble, and a subcarrier spacing of a message 3. For another example, the initial frequency offset and the frequency hopping offset are determined based on at least one of a subcarrier spacing of the random access preamble, a subcarrier spacing of a message 3, and a quantity of random access resources within a same time period.

Based on the embodiment shown in FIG. 2a, the terminal device determines the frequency position of the random access resource based on at least one of the initial frequency offset, the random access resource configuration period, the uplink channel bandwidth, the bandwidth of the random access resource, the time period of the random access resource, and the frequency index of the random access resource that are configured by the network device, and the terminal device sends the random access signal to the network device at the determined frequency position. In this way, the terminal device is prevented from shooting in the dark on a random access resource when sending the random access signal, thereby improving efficiency of a random access process.

Figure 3A:
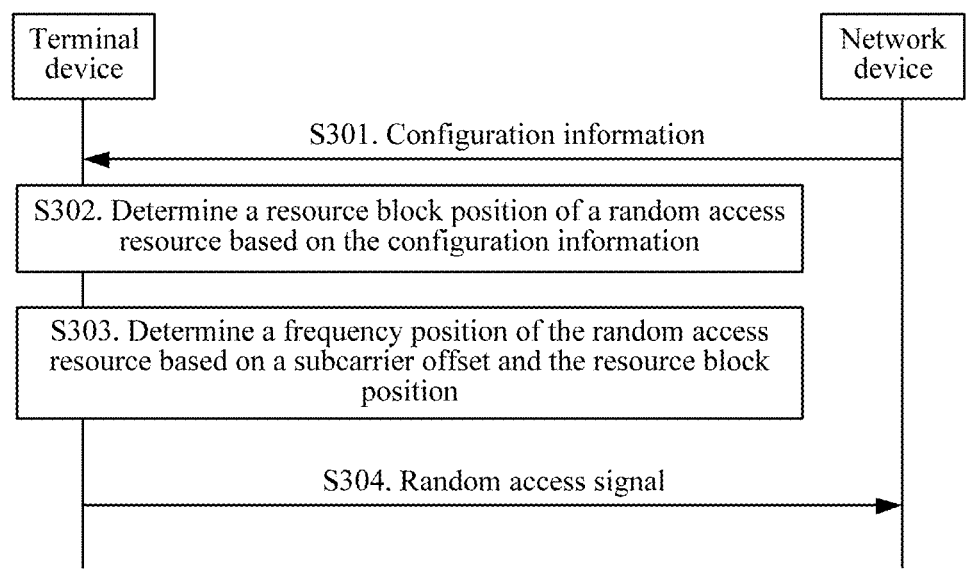
FIG. 3a is another schematic flowchart of a random access signal sending method according to an embodiment of the present invention.

FIG. 3a is a schematic flowchart of a random access signal sending method according to an embodiment of the present invention. In this embodiment of the present invention, the method includes the following steps.

S301. A network device sends configuration information to a terminal device, and the terminal device receives the configuration information from the network device.

The configuration information includes at least one of an initial frequency offset, a random access resource configuration period, an uplink channel bandwidth, a bandwidth of a random access resource, a time period of a random access resource, a time period of the random access resource, and a frequency index of the random access resource. The random access resource is a time-frequency resource used for transmitting a random access preamble. The random access resource occupies a particular time in time domain and occupies a particular bandwidth in frequency domain. A random access resource configuration pattern represents a time length within which a specified time-frequency resource set periodically recurs, and the random access resource configuration period may be represented through a quantity of system frames, subframes, slots, or OFDM symbols. The uplink channel bandwidth represents a system bandwidth used by the terminal device to perform uplink sending, and a size of the uplink channel bandwidth may be represented through a quantity of RBs. The bandwidth of the random access resource represents a size of a frequency resource occupied by the random access resource in frequency domain, and the bandwidth may be represented through a quantity of RBs. The time period of the random access resource represents a time length occupied by the random access resource in time domain, and the time length may be represented through a quantity of subframes, slots, or OFDM symbols. The frequency index of the random access resource represents a number of the random access resource in frequency domain.

Figure 3B:
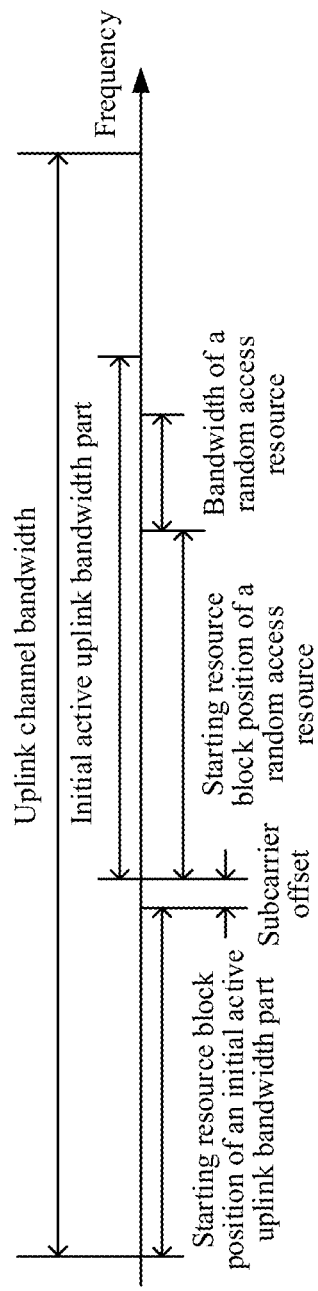
FIG. 3b is a schematic diagram of a frequency domain position of a random access resource according to an embodiment of the present invention.

In a possible implementation, the configuration information further includes a bandwidth of an initial active uplink bandwidth part (initial active uplink bandwidth part). Referring to FIG. 3b, the initial frequency offset includes a starting resource block position of an initial active uplink bandwidth part in the uplink channel bandwidth and a starting resource block position of a random access resource in the initial active uplink bandwidth part. The two starting resource block positions may be based on different subcarrier spacings. Optionally, the starting resource block position of the random access resource in the initial active uplink bandwidth part in FIG. 3b is fixed to 0. Optionally, the starting resource block position of the initial active uplink bandwidth part in the uplink channel bandwidth in FIG. 3b is a fixed value, for example, is fixed to any one of a same center frequency, a same starting frequency, and a same ending frequency.

S302. The terminal device determines a resource block position of the random access resource based on the configuration information.

The resource block position of the random access resource is only a resource position at which the random access resource is in an initial active uplink bandwidth part. The terminal device further needs to determine an absolute frequency position of the random access resource jointly based on a frequency position at which the initial active uplink bandwidth part is in the uplink channel bandwidth, a resource position in the initial active uplink bandwidth part, a subcarrier offset, and a frequency position on an uplink channel.

The random access resource is a time-frequency resource used for transmitting a random access preamble. The random access resource occupies a particular time in time domain and occupies a particular bandwidth in frequency domain. A random access resource configuration pattern represents position distribution of all available random access resources in a specified time-frequency resource set. The random access resource configuration period is a time length of the time-frequency resource set, and the random access resource configuration period may be represented through a quantity of system frames, subframes, slots, or OFDM symbols. The random access resource configuration pattern periodically recurs, and a repetition period is the random access resource configuration period. The uplink channel bandwidth represents a system bandwidth used by the terminal device to perform uplink sending. A size of the uplink channel bandwidth may be represented through a quantity of RBs. The bandwidth of the random access resource represents a size of a frequency resource occupied by the random access resource in frequency domain, and the bandwidth may be represented through a quantity of RBs. The time period of the random access resource represents a time length occupied by the random access resource in time domain, and the time length may be represented through a quantity of subframes, slots, or OFDM symbols. The frequency index of the random access resource represents an index of the random access resource in frequency domain. Identical random access resources have a same frequency index.

For the random access resource configuration pattern, a time length of the random access resource configuration pattern is K slots in a subcarrier spacing corresponding to the random access preamble, where K is a positive integer. Optionally, the time length of the random access resource configuration pattern is determined based on at least one actually transmitted downlink signal. When the at least one actually transmitted downlink signal is larger and more random access resources are associated with the at least one actually transmitted downlink signal, the time length of the random access resource configuration pattern is longer. Otherwise, an actual length of the random access resource configuration pattern is shorter. Optionally, the random access resource configuration period is at least one of 0.125 ms, 0.25 ms, 0.5 ms, 2 ms, 1 ms, 5 ms, 10 ms, 20 ms, 40 ms, 80 ms, 160 ms, and 320 ms, where 0.125 ms is one slot corresponding to 120 kHz, 0.25 ms is one slot corresponding to 60 kHz or two slots corresponding to 120 kHz. Optionally, the random access resource configuration period and the time length of the random access resource configuration pattern are both configured by the network device. Optionally, the random access resource configuration period and the time length of the random access resource configuration pattern are separately obtained based on a random access resource configuration index.

Optionally, the random access resource configuration period is obtained based on a random access resource configuration index, and the time length of the random access resource configuration pattern is obtained based on the configuration information of the network device.

Optionally, the time length of the random access resource configuration pattern is obtained based on a random access resource configuration index, and the random access resource configuration period is obtained based on the configuration information of the network device.

The configuration information may be indicated through at least one of RRC signaling, SI, RMSI, NR SIB0, NR SIB1, MAC CE signaling, DCI, a PBCH, and a PDCCH order.

In a possible implementation, the configuration information further includes a frequency hopping offset.

Specifically, for explanations and descriptions of the frequency hopping offset, refer to the foregoing descriptions. Details are not described herein again.

In another possible implementation, the initial frequency offset $f_{offset}$ is determined based on indication information of the network device and/or the bandwidth $N_{RA}$ of the random access resource. For example, when the indication information of the network device is X, $f_{offset}=X \times N_{RA}$ or $f_{offset}=R_{RA} \times \lfloor N_{RB}/X \rfloor$.

Method 1: The terminal device may determine the resource block position of the random access resource based on the following fourteenth formula.

Fourteenth Formula:

when $\lfloor t_{RA}/T_{RA} \rfloor$ mod 2=0, $F_{RB}=f_{start}+N_{RA} \times f_{RA}$; or when $\lfloor t_{RA}/T_{RA} \rfloor$ mod 2=1, $F_{RB}=N_{RB}-f_{start}-N_{RA} \times (f_{RA}+1)$, where $\lfloor \ \rfloor$ represents a rounding down operation, mod represents a modulo operation, $F_{RB}$ is the resource block position of the random access resource, $f_{start}$ is the initial frequency offset, $T_{RA}$ is the random access resource configuration period, $N_{RB}$ is the uplink channel bandwidth, $N_{RA}$ is the bandwidth of the random access resource, $t_{RA}$ is the time period of the random access resource, and $f_{RA}$ is the frequency index of the random access resource.

Method 2: The terminal device determines the resource block position of the random access resource based on the following fifteenth formula.

Fifteenth Formula:

when $\lfloor t_{RA}/T_{RA} \rfloor$ mod 2=0 and $f_{RA}$ mod 2=0, $F_{RB}=f_{start}+N_{RA} \times \lfloor f_{RA}/2 \rfloor$;

when $\lfloor t_{RA}/T_{RA} \rfloor$ mod 2=0 and $f_{RA}$ mod 2=1, $F_{RB}=N_{RB}-f_{start}-N_{RA} \times (\lfloor f_{RA}/2 \rfloor+1)$;

when $\lfloor t_{RA}/T_{RA} \rfloor$ mod 2=1 and $f_{RA}$ mod 2=0, $F_{RB}=N_{RB}-f_{start}-N_{RA} \times (\lfloor f_{RA}/2 \rfloor+1)$; or when $\lfloor t_{RA}/T_{RA} \rfloor$ mod 2=1 and $f_{RA}$ mod 2=1, $F_{RB}=f_{start}+N_{RA} \times \lfloor f_{RA}/2 \rfloor$, where $\lfloor \ \rfloor$ represents a rounding down operator, mod represents a modulo operator, $F_{RB}$ is the resource block position of the random access resource, $f_{start}$ is the initial frequency offset, $T_{RA}$ is the random access resource configuration period, $N_{RB}$ is the uplink channel bandwidth, $N_{RA}$ is the bandwidth of the random access resource, $t_{RA}$ is the time period of the random access resource, and $f_{RA}$ is the frequency index of the random access resource.

Method 3: The terminal device determines the resource block position of the random access resource based on the following sixteenth formula.

Sixteenth Formula:

when $\lfloor t_{RA}/T_{RA} \rfloor$ mod 2=0, $F_{RB}=f_{start}+N_{RA} \times f_{RA}$; or when $\lfloor t_{RA}/T_{RA} \rfloor$ mod 2=1, $F_{RB}=(f_{start}+f_{offset}+N_{RA} \times f_{RA})$ mod $N_{RB}$, where $\lfloor \ \rfloor$ represents a rounding down operator, mod represents a modulo operator, $F_{RB}$ is the resource block position of the random access resource, $f_{start}$ is the initial frequency offset, $T_{RA}$ is the random access resource configuration period, $N_{RB}$ is the uplink channel bandwidth, $N_{RA}$ is the bandwidth of the random access resource, $t_{RA}$ is the time period of the random access resource, $f_{RA}$ is the frequency index of the random access resource, and $f_{offset}$ is the frequency hopping offset.

Method 4: The configuration information further includes a mapping relationship between at least one actually sent downlink signal and a random access resource in a random access resource configuration pattern.

Specifically, the actually sent downlink signal is a signal used by the network device to perform downlink synchronization sending, and the downlink signal includes but is not limited to any one of an SS/PBCH block, a DMRS, and a CSI-RS.

The network device determines the resource block position of the random access resource based on the mapping relationship between the at least one actually sent downlink signal and the random access resource in the random access resource configuration pattern.

For example, when the at least one actually sent downlink signal and a plurality of random access resources in the random access resource configuration pattern have a mapping relationship, the terminal device determines the resource block position of the random access resource based on the following seventeenth formula.

Seventeenth Formula:

when $n_{RO}$ mod 2=0, $F_{RB}=f_{start}+N_{RA} \times f_{RA}^{RO}$; or when $n_{RO}$ mod 2=1, $F_{RB}=N_{RB}-f_{start}-N_{RA} \times (f_{RA}^{RO}+1)$, where mod represents a modulo operator, $F_{RB}$ is the resource block position of the random access resource, $f_{start}$ is the initial frequency offset, $f_{offset}$ is the frequency hopping offset, $n_{RO}$ is an index of the random access resource, $t_{RA}^{RO}$ represents the time period of the random access resource, and may be represented through a quantity of slots, subframes, or OFDM symbols, $f_{RA}^{RO}$ is the frequency index of the random access resource, $N_{RA}$ is the bandwidth of the random access resource, and $N_{RB}$ represents the uplink channel bandwidth, which, for example, is represented through a quantity of RBs.

Method 5: The terminal device determines the resource block position of the random access resource based on the following eighteenth formula.

Eighteenth Formula:

$F_{RB}=(f_{start}+f_{RA}^{RO} \times f_{offset}+N_{RA} \times f_{RA}^{RO})$ mod $N_{RB}$, where mod represents a modulo operator, $F_{RB}$ is the resource block position of the random access resource, $f_{start}$ is the initial frequency offset, $n_{RO}$ is the index of the random access resource, $t_{RA}^{RO}$ represents the time period of the random access resource, and may be represented through a quantity of slots, subframes, or OFDM symbols, $f_{offset}$ represents the frequency hopping offset, $N_{RA}$ is the bandwidth of the random access resource, and $N_{RB}$ represents the uplink channel bandwidth, which, for example, is represented through a quantity of RBs.

Method 6: The terminal device determines the resource block position of the random access resource based on the following nineteenth formula.

Nineteenth Formula:

when $t_{RA}^{RO}$ mod 2=0, $F_{RB}=f_{start}+N_{RA} \times f_{RA}^{RO}$; or when $t_{RA}^{RO}$ mod 2=1, $F_{RB}=N_{RB}-f_{start}-N_{RA} \times (f_{RA}^{RO}+1)$, where mod represents a modulo operator, $F_{RB}$ is the resource block position of the random access resource, $f_{start}$ is the initial frequency offset, $n_{RO}$ is an index of the random access resource, $t_{RA}^{RO}$ represents the time period of the random access resource, and may be represented through a quantity of slots, subframes, or OFDM symbols, $f_{RA}^{RO}$ is the frequency index of the random access resource, $N_{RA}$ is the bandwidth of the random access resource, and $N_{RB}$ represents the uplink channel bandwidth, which, for example, is represented through a quantity of RBs.

Method 7: The terminal device determines the resource block position of the random access resource based on the following twentieth formula.

Twentieth Formula:

when $t_{RA}^{RO}$ mod 2=0, $F_{RB}=f_{start}+N_{RA}\times f_{RA}^{RO}$; or when $t_{RA}^{RO}$ mod 2=1, $F_{RB}=(f_{start}+t_{RA}^{RO}\times f_{offset}+N_{RA}\times f_{RA}^{RO})$ mod $N_{RB}$, where mod represents a modulo operator, $F_{RB}$ is the resource block position of the random access resource, $f_{start}$ is the initial frequency offset, $f_{offset}$ is the frequency hopping offset, $n_{RO}$ is an index of the random access resource, $t_{RA}^{RO}$ represents the time period of the random access resource, and may be represented through a quantity of slots, subframes, or OFDM symbols, $f_{RA}^{RO}$ is the frequency index of the random access resource, $N_{RA}$ is the bandwidth of the random access resource, and $N_{RB}$ represents the uplink channel bandwidth, which, for example, is represented through a quantity of RBs.

For another example, when the at least one actually sent downlink signal and a random access resource in the random access resource configuration pattern have a mapping relationship, the terminal device determines the resource block position of the random access resource based on any one of the foregoing first formula to third formula.

Method 8: The resource block position of the random access resource is determined based on a format of the random access preamble and the at least one actually transmitted downlink signal.

Specifically, when the random access preamble has a length of 839, the random access preamble is defined to have four formats, which are a format 0 to a format 3 respectively. When the random access preamble has a length of 127 or 139, the random access preamble is defined to have ten formats, which are A0, A1, A2, A3, B1, B2, B3, B4, C0, and C2 respectively.

For example, when the format of the random access preamble is any one of A0, A1, B1, and C0, the terminal device determines the resource block position of the random access resource based on the fourteenth formula or the fifteenth formula. When the format of the random access preamble is none of A0, A1, B1, and C0, the terminal device determines the resource block position of the random access resource based on the sixteenth formula.

For another example, when the format of the random access preamble is any one of A0, A1, B1, and C0, and the quantity of actually sent downlink signals is less than or equal to M, the terminal device determines the resource block position of the random access resource based on the first formula or the second formula. Otherwise, the terminal device determines the resource block position of the random access resource based on the third formula. M is an integer greater than 0, and a value of M may be configured by the network device, or may be a predefined value.

Method 9: The resource block position of the random access resource is determined based on a frame structure type or a duplex mode.

Specifically, frame structures used by the terminal device include a TDD (time division duplex) frame or an FDD (frequency division duplex) frame. The duplex mode includes full duplex, time division duplex, or frequency division duplex.

For example, when the terminal device uses the FDD frame or the frequency division duplex to send a random access signal, the terminal device determines the resource block position of the random access resource based on the first formula or the second formula. When the terminal device uses the TDD frame or the time division duplex to send a random access signal, the terminal device determines the resource block position of the random access resource based on the third formula. When the terminal device uses the full duplex to send a random access signal, the terminal device determines the frequency position of the random access resource based on the nineteenth formula.

In another possible implementation, the terminal device further determines the resource block position of the random access resource based on uplink/downlink configuration information and/or a duplex mode. The uplink/downlink configuration information includes at least one of an uplink slot, a downlink slot, information about a quantity of undetermined slots, and period information $T_{DL/UL}$. Specifically, the frequency position is determined based on the following twenty-first formula.

Twenty-First Formula:

when $\lfloor t_{RA}/T_{DL/UL} \rfloor$ mod 2=0, $F_{RB}=f_{start}+N_{RA}\times f_{RA}$; or when $\lfloor t_{RA}/T_{DL/UL} \rfloor$ mod 2=1, $F_{RB}=N_{RB}-f_{start}-N_{RA}\times(f_{RA}+1)$, where mod represents a modulo operator, $F_{RB}$ is the resource block position of the random access resource, $f_{start}$ is the initial frequency offset, $T_{DL/UL}$ represents the uplink/downlink configuration information, $N_{RA}$ is the bandwidth of the random access resource, $N_{RB}$ represents the uplink channel bandwidth, which, for example, is represented through a quantity of RBs, $t_{RA}$ represents the time period of the random access resource, and $f_{RA}$ is the frequency index of the random access resource.

For another example, the terminal device determines the frequency position based on the following twenty-second formula.

Twenty-Second Formula:

when $\lfloor t_{RA}/T_{DL/UL} \rfloor$ mod 2=0 and $f_{RA}$ mod 2=0, $F_{RB}=f_{start}+N_{RA}\times\lfloor f_{RA}/2 \rfloor$;

when $\lfloor t_{RA}/T_{DL/UL} \rfloor$ mod 2=1 and $f_{RA}$ mod 2=1, $F_{RB}=N_{RB}-f_{start}-N_{RA}\times(\lfloor f_{RA}/2 \rfloor+1)$;

when $\lfloor t_{RA}/T_{DL/UL} \rfloor$ mod 2=0 and $f_{RA}$ mod 2=0, $F_{RB}=N_{RB}-f_{start}-N_{RA}\times(\lfloor f_{RA}/2 \rfloor+1)$; or when $\lfloor t_{RA}/T_{DL/UL} \rfloor$ mod 2=1 and $f_{RA}$ mod 2=1, $F_{RB}=f_{start}+N_{RA}\times\lfloor f_{RA}/2 \rfloor$, where mod represents a modulo operator, $\lfloor \ \rfloor$ represents a rounding down operator, $F_{RB}$ is the resource block position of the random access resource, $f_{start}$ is the initial frequency offset, $T_{DL/UL}$ represents the uplink/downlink configuration information, $N_{RA}$ is the bandwidth of the random access resource, $N_{RB}$ represents the uplink channel bandwidth, which, for example, is represented through a quantity of RBs, $t_{RA}$ represents the time period of the random access resource, and $f_{RA}$ is the frequency index of the random access resource.

For another example, the terminal device determines the frequency position based on the following twenty-third formula.

Twenty-Third Formula:

$$\text{when } \lfloor t_{RA}/T_{DL/UL} \rfloor \bmod 2 = 0, F_{RB} = f_{start} + N_{RA} \times f_{RA}; \text{ or}$$

$$\text{when } \lfloor t_{RA}/T_{DL/UL} \rfloor \bmod 2 = 1, F_{RB} = (f_{start} + f_{offset} + N_{RA} \times f_{RA}) \bmod N_{RB}, \text{ where}$$

mod represents a modulo operator, $\lfloor \ \rfloor$ represents a rounding down operator, $F_{RB}$ is the resource block position of the random access resource, $f_{start}$ is the initial frequency offset, $T_{DL/UL}$ represents the uplink/downlink configuration information, $N_{RA}$ is the bandwidth of the random access resource, $N_{RB}$ represents the uplink channel bandwidth, which, for example, is represented through a quantity of RBs, $t_{RA}$ represents the time period of the random access resource, and $f_{RA}$ is the frequency index of the random access resource.

In another possible implementation, the terminal device further determines the resource block position of the random access resource based on a time period T configured by the network device or a preset time period T. Optionally, T is an absolute time, to be specific, a quantity of OFDM symbols, a quantity of slots, a quantity of subframes, a quantity of frames, and a quantity of milliseconds, such as 0.125 ms, 0.25 ms, 0.5 ms, 2 ms, 1 ms, 5 ms, 10 ms, 20 ms, 40 ms, 80 ms, 160 ms, and 320 ms. For another example, T is a quantity of random access resources. For example, the terminal device determines the frequency position of the random access resource based on the following twenty-fourth formula.

Twenty-Fourth Formula:

$$\text{when } \lfloor t_{RA}/T \rfloor \bmod 2 =, F_{RB} = f_{start} + N_{RA} \times f_{RA}; \text{ or}$$

$$\text{when } t_{RA}/T \rfloor \bmod 2 = 1, F_{RB} = N_{RB} - f_{start} - N_{RA} \times (f_{RA} + 1),$$
where mod represents a modulo operator, $\lfloor \ \rfloor$ represents a rounding down operator, $F_{RB}$ is the resource block position of the random access resource, $f_{start}$ is the initial frequency offset, T represents the quantity of random access resources in the random access resource configuration pattern, $N_{RA}$ is the bandwidth of the random access resource, $N_{RB}$ represents the uplink channel bandwidth, which, for example, is represented through a quantity of RBs, $t_{RA}$ represents the time period of the random access resource, and $f_{RA}$ is the frequency index of the random access resource.

For another example, the terminal device determines the frequency position of the random access resource based on the following twenty-fifth formula.

Twenty-Fifth Formula:

$$\text{when } \lfloor t_{RA}/T \rfloor \bmod 2 = 0 \text{ and } f_{RA} \bmod 2 = 0, F_{RB} = f_{start} + N_{RA} \times \lfloor f_{RA}/2 \rfloor;$$

$$\text{when } \lfloor t_{RA}/T \rfloor \bmod 2 = 1 \text{ and } f_{RA} \bmod 2 = 1, F_{RB} = N_{RB} - f_{start} - N_{RA} \times (\lfloor f_{RA}/2 \rfloor + 1);$$

$$\text{when } \lfloor t_{RA}/T \rfloor \bmod 2 = 0 \text{ and } f_{RA} \bmod 2 = 0, F_{RB} = N_{RB} - f_{start} - N_{RA} \times (\lfloor f_{RA}/2 \rfloor + 1); \text{ or}$$

$$\text{when } \lfloor t_{RA}/T \rfloor \bmod 2 = 1 \text{ and } f_{RA} \bmod 2 = 1, F_{RB} = f_{start} + N_{RA} \times \lfloor f_{RA}/2 \rfloor, \text{ where}$$

mod represents a modulo operator, $\lfloor \ \rfloor$ represents a rounding down operator, $F_{RB}$ is the resource block position of the random access resource, $f_{start}$ is the initial frequency offset, T represents the quantity of random access resources in the random access resource configuration pattern or T is a quantity of downlink signals associated with the random access resource, $N_{RA}$ is the bandwidth of the random access resource, $N_{RB}$ represents the uplink channel bandwidth, which, for example, is represented through a quantity of RBs, $t_{RA}$ represents the time period of the random access resource, and $f_{RA}$ is the frequency index of the random access resource.

For another example, the terminal device determines the frequency position of the random access resource based on the following twenty-sixth formula.

Twenty-Sixth Formula:

$$\text{when } \lfloor t_{RA}/T \rfloor \bmod 2 = 0, F_{RB} = f_{start} + N_{RA} \times f_{RA}; \text{ or}$$

$$\text{when } \lfloor t_{RA}/T \rfloor \bmod 2 = 1, F_{RB} = (f_{start} + f_{offset} + N_{RA} \times f_{RA}) \bmod N_{RB}, \text{ where}$$

mod represents a modulo operator, $\lfloor \ \rfloor$ represents a rounding down operator, $F_{RB}$ is the resource block position of the random access resource, $f_{start}$ is the initial frequency offset, T represents the quantity of random access resources in the random access resource configuration pattern, $N_{RA}$ is the bandwidth of the random access resource, $N_{RB}$ represents the uplink channel bandwidth, which, for example, is represented through a quantity of RBs, $t_{RA}$ represents the time period of the random access resource, $f_{RA}$ is the frequency index of the random access resource, and $f_{offset}$ is the frequency hopping offset.

It should be noted that the foregoing determined resource block position of the random access resource is only a resource position at which the random access resource is in an initial active uplink bandwidth part. The terminal device further needs to determine an absolute frequency position of the random access resource jointly based on a frequency position at which the initial active uplink bandwidth part is in the uplink channel bandwidth, a resource position in the initial active uplink bandwidth part, a subcarrier offset, and a frequency position on an uplink channel.

In all embodiments of the present invention, the initial frequency offset $f_{start}$ may be a value configured or indicated by the network device or a preset value, for example, preset to 0. It should be noted that all conditions for determining that X mod 2 is equal to 0 or 1 in the present invention are only for illustrative description. In practice, it may be that X mod K is equal to 0, 1, . . . , or K−1, where K is an integer not less than 2.

A method used by the terminal device to obtain the subcarrier offset may be: determining the subcarrier offset based on an offset of the at least one actually sent downlink signal (for example, an SS block), where the offset of the at least one actually sent downlink signal is the same as the subcarrier offset; if a subcarrier spacing SCS 1 of a downlink signal (or a downlink initial access bandwidth part) is different from a subcarrier spacing SCS 2 of the random access resource or the initial active uplink bandwidth part (or the uplink channel bandwidth), the subcarrier offset of the random access resource needs to be determined jointly based on the SCS 1, the subcarrier offset Offset, and the SCS 2, for example, the offset is M=Offset×SCS1/SCS2. Also, the subcarrier offset is a preconfigured or prestored value. Also, the subcarrier offset is related to a frequency index and/or a carrier frequency of an initial available random access resource in the random access resource configuration pattern. Also, the subcarrier offset is different from the offset of the at least one downlink signal, and indication information indicating the subcarrier offset is different from indication information indicating the offset of the at least one actually sent downlink signal, where the indication information indicating the subcarrier offset includes at least one of RRC signaling, SI, RMSI, NR SIB0, NR SIB1, MAC CE signaling, DCI, a PBCH, and a PDCCH order.

S303. The terminal device determines the frequency position of the random access resource based on the subcarrier offset and the resource block position.

The frequency position of the random access resource represents an absolute position of the random access resource in frequency domain, and the frequency position of the random access resource uses a subcarrier or an RE as a granularity. A starting frequency of the random access resource is aligned with a starting frequency of a subcarrier or an RE. For example, the frequency position of the random access resource may be represented through a frequency position of a starting subcarrier or a frequency position of a middle subcarrier.

In a possible implementation, the terminal device determines the frequency position of the random access resource based on the following twenty-seventh formula.

Twenty-Seventh Formula:

$$F_{SC} = F_{RB} \times N_{SC}^{RB} + M, \text{ where}$$

$F_{SC}$ is the frequency position of the random access resource, and uses a subcarrier or an RE as a granularity; $F_{RB}$ is the resource block position of the random access resource, and uses an RB or an RB group as a granularity; $N_{SC}^{RB}$ is a quantity of subcarriers included in one RB; and M is the subcarrier offset.

It should be noted that if in a random access resource configuration period or a random access resource configuration pattern, one downlink signal is mapped to a plurality of random access resources, the terminal device may select one of the plurality of random access resources randomly or according to a predefined rule as the random access resource for random access. The predefined rule may be: selecting, based on a minimum bandwidth capability of the terminal device, any random access resource in the supported bandwidth; or selecting a corresponding random access resource based on a size of a message 3 of the terminal device, receive power (or a path loss or transmit power) of a downlink signal, a preset threshold, and a correspondence between the random access resource and the threshold; or selecting, by the terminal device, a random access resource according to another rule. This embodiment imposes no limitation thereon.

S304. The terminal device sends a random access signal to the network device at the frequency position of the random access resource, and the network device receives the random access signal from the terminal device.

Specifically, the terminal device selects one random access preamble from a random access preamble set; maps the selected random access preamble to the frequency position of the random access resource determined in S303, to generate a random access signal; and sends the random access signal to the network device. A rule used by the terminal device to select a to-be-sent random access preamble is not limited in this embodiment.

It should be noted that before receiving the random access signal sent by the terminal device, the network device needs to determine the frequency position of the random access resource based on the resource block position and the subcarrier offset of the random access resource. For a process of determining the frequency position, refer to the process of determining the frequency position of the random access resource by the terminal device in FIG. 3a. Details are not described herein again.

The terminal device may generate the random access signal based on the following twenty-eighth formula.

Twenty-eighth formula $$s(t) = \beta_{PRACH} \sum_{k=0}^{N_{ZC}-1} \sum_{n=0}^{N_{ZC}-1} x_{u,v}(n) \cdot e^{-j\frac{2\pi nk}{N_{ZC}}} \cdot e^{j2\pi(k+\varphi+Kk_0)\Delta f_{RA}(t-T_{CP})};$$

or $$s(t) = \beta_{PRACH} \sum_{k=0}^{N_{ZC}-1} \sum_{n=0}^{N_{ZC}-1} x_{u,v}(n) \cdot e^{-j\frac{2\pi nk}{N_{ZC}}} \cdot e^{j2\pi(k+\varphi+K(k_0+1/2))\Delta f_{RA}(t-T_{CP})},$$

where s(t) is the random access signal; $\beta_{PRACH}$ is an amplitude adjustment factor of the random access signal, and is used to control transmit power of the random access signal; $N_{ZC}$ is a sequence length of a random access preamble; $x_{u,v(n)}$ represents a ZC sequence; $T_{CP}$ represents a length of a cyclic prefix; and t represents a time period of a preamble, starts from 0, and includes the sequence length and the length of the CP: $0 \leq t < T_{SEQ} + T_{CP}$.

$\Delta f_{RA}$ represents a subcarrier spacing of the random access preamble; $K = \Delta f / \Delta f_{RA}$, where $\Delta f$ represents a subcarrier spacing of an initial active uplink bandwidth part (IAU BWP) or an active uplink bandwidth part (BWP); t is a time position of the random access resource; and a value of φ is shown in Table 4.

TABLE 4

| Random access preamble format | $\Delta f_{RA}$ | φ |
|---|---|---|
| 0, 1, 2 | 1250 Hz | K1 |
| 3 | 5000 Hz | K2 |
| A0, A1, A2, A3, B1, B2, B3, B4, C0, C1 | {15, 30, 60, 120 kHz} | K3 |

K1 and K2 may be any integers from 0 to 25, and K3 may be any integer from 0 to 5. For example, K1=12, K2=12, and K3=2. For another example, K1=13, K2=13, and K3=3.

For example, when K1=12, K2=12, and K3=2, the random access signal may also be generated based on the following twenty-ninth formula.

A person skilled in the art should understand that, some parameters in the twenty-eighth formula are consistent with parameters in a random access signal generation formula in an LTE protocol. For example, meanings of the parameters may be understood as follows:

s(t) is the random access signal, and $\beta_{PRACH}$ is an amplitude adjustment factor of the random access signal, and is used to control transmit power of the random access signal.

$N_{ZC}$ is a sequence length of a random access preamble, where based on records in Table 3, the sequence length may be 839 or 139.

$x_{u,v}(n)$ represents a sequence for generating the random access preamble, and may be, for example, a ZC sequence.

$T_{CP}$ represents an absolute time length of a cyclic prefix according to an LTE standard, and $T_{SEQ}$ represents an absolute time length of the sequence. As shown in Table 3A, different preamble formats correspond to different time lengths, where $T_{RA} = 1/(15000 \times 2048)$ seconds.

TABLE 3A

| Preamble format | $T_{CP}$ | $T_{SEQ}$ |
|---|---|---|
| 0 | $3168 \cdot T_s$ | $24576 \cdot T_s$ |
| 1 | $21024 \cdot T_s$ | $24576 \cdot T_s$ |
| 2 | $6240 \cdot T_s$ | $2 \cdot 24576 \cdot T_s$ |
| 3 | $21024 \cdot T_s$ | $2 \cdot 24576 \cdot T_s$ |
| 4 | $448 \cdot T_s$ | $4096 \cdot T_s$ | t represents an absolute time of a preamble, starts from 0, and includes the sequence length and the length of the CP, and $0 \leq t < T_{SEQ}+T_{CP}$.

$t-T_{CP}$ represents the absolute time of the preamble minus the absolute time of the cyclic prefix, that is, a time length of the sequence.

$\Delta f_{RA}$ represents a subcarrier spacing of the random access preamble.

$K=\Delta f/\Delta f_{RA}$, where $\Delta f$ represents a subcarrier spacing of an initial active uplink bandwidth part (IAU BWP) or an uplink access bandwidth part (BWP).

$k_0$ is a frequency position of a starting subcarrier on a random access channel, and $k_0 = F_{RB} N_{sc}^{RB} - N_{RB}^{UL} N_{sc}^{RB}/2$ or $k_0 = F_{SC} - N_{RB}^{UL} N_{sc}^{RB}/2$, where $F_{RB}$ is the frequency position (of the resource block) of the random access resource that is obtained in the foregoing embodiment, $F_{SC}$ is the frequency position (of the resource element or the subcarrier) of the random access resource that is obtained in the foregoing embodiment, $N_{sc}^{RB}$ is a quantity of subcarriers in an RB, and a value of $N_{sc}^{RB}$ is 12, and $N_{RB}^{UL}$ is an uplink channel bandwidth.

φ (where the variant may also be represented through another letter) represents an offset relative to the frequency position of the random access resource (an extra offset on a frequency of the random access channel, where a starting frequency position of the random access channel includes an RB position and the subcarrier offset). A value of φ is shown in Table 4, and details are not described again.

Twenty-ninth formula $$s(t) = \beta_{PRACH} \sum_{k=0}^{N_{ZC}-1} \sum_{n=0}^{N_{ZC}-1} x_{u,v}(n) \cdot e^{-j\frac{2\pi nk}{N_{ZC}}} \cdot e^{j2\pi(k+\varphi+Kk_0+1/2)\Delta f_{RA}(t-T_{CP})}$$

For descriptions of various parameters in the twenty-ninth formula, refer to the twenty-eighth formula.

For another example, when K1=13, K2=13, and K3=2, the random access signal may also be generated based on the following thirtieth formula.

Thirtieth formula $$s(t) = \beta_{PRACH} \sum_{k=0}^{N_{ZC}-1} \sum_{n=0}^{N_{ZC}-1} x_{u,v}(n) \cdot e^{-j\frac{2\pi nk}{N_{ZC}}} \cdot e^{j2\pi(k+\varphi+Kk_0-1/2)\Delta f_{RA}(t-T_{CP})}$$

For descriptions of various parameters in the thirtieth formula, refer to the twenty-eighth formula.

Based on the embodiment in FIG. 3a, the terminal device determines the frequency position of the random access resource based on the resource block position and the subcarrier offset of the random access resource. In this way, the terminal device can use frequency resources through a subcarrier or an RE as a granularity, thereby improving utilization of the frequency resources.

Figure 4:
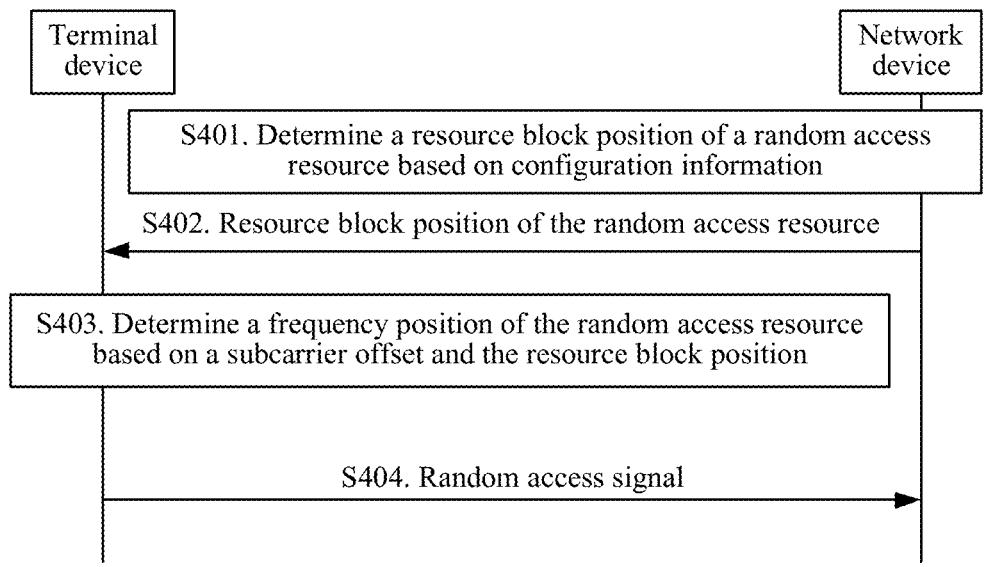
FIG. 4 is another schematic flowchart of a random access signal sending method according to an embodiment of the present invention.

FIG. 4 is another schematic flowchart of a random access signal sending method according to an embodiment of the present invention. In this embodiment of the present invention, the method includes the following steps.

S401. A network device determines a resource block position of a random access resource based on configuration information.

For a process of determining the resource block position of the random access resource by the network device based on the configuration information, refer to the process of determining the resource block position of the random access resource by the terminal device based on the configuration information in FIG. 3a. Details are not described herein again.

S402. The network device sends the resource block position of the random access resource to a terminal device, and the terminal device receives the resource block position of the random access resource from the network device.

The network device may send the resource block position of the random access resource through at least one of RRC signaling, SI, RMSI, NR SIB0, NR SIB1, MAC CE signaling, DCI, a PBCH, and a PDCCH order.

S403. The terminal device determines a frequency position of the random access resource based on a subcarrier offset and the resource block position.

For a specific process of S403, refer to the descriptions of S303 in FIG. 3a. Details are not described herein again.

S404. The terminal device sends a random access signal to the network device, and the network device receives the random access signal from the terminal device.

For a specific process of S404, refer to the descriptions of S304 in FIG. 3a. Details are not described herein again.

Based on the embodiment in FIG. 4, the terminal device determines the frequency position of the random access resource based on the resource block position and the subcarrier offset of the random access resource. In this way, the terminal device can use frequency resources through a subcarrier or an RE as a granularity, thereby improving utilization of the frequency resources.

The random access signal sending method in the embodiment of the present invention of FIG. 2a is described in detail, and a random access signal sending apparatus (hereinafter briefly referred to as an apparatus 5) according to an embodiment of the present invention is provided below.

Figure 5:
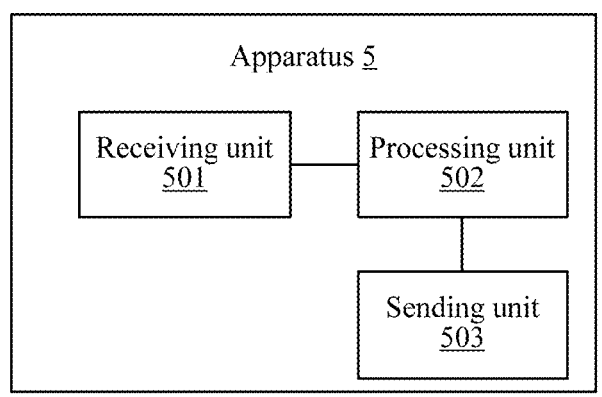
FIG. 5 is a schematic structural diagram of a random access signal sending apparatus according to an embodiment of the present invention.

It should be noted that the apparatus 5 shown in FIG. 5 can implement steps on a side of the terminal device in the embodiment shown in FIG. 2a. The apparatus 5 includes a receiving unit 501, a processing unit 502, and a sending unit 503. The receiving unit 501 is configured to receive configuration information from a network device, where the configuration information includes at least one of an initial frequency offset, a random access resource configuration period, an uplink channel bandwidth, a bandwidth of the random access resource, a time period of a random access resource, a time period of the random access resource, and a frequency index of the random access resource. The processing unit 502 is configured to determine a frequency position of the random access resource based on the configuration information. The sending unit 503 is configured to send a random access signal to the network device at the frequency position of the random access resource.

Optionally, the configuration information further includes: a frequency hopping offset.

Optionally, that the processing unit 502 is configured to determine a frequency position of the random access resource based on the configuration information specifically includes:

when $\lfloor t_{RA}/T_{RA} \rfloor \bmod 2=0$, $F_{RB}=f_{start}+N_{RA} \times f_{RA}$; or when $\lfloor t_{RA}/T_{RA} \rfloor \bmod 2=1$, $F_{RB}=N_{RB}-f_{start}-N_{RA} \times (f_{RA}+1)$, where $F_{RB}$ is the frequency position of the random access resource, $f_{start}$ is the initial frequency offset, $T_{RA}$ is the random access resource configuration period, $N_{RB}$ is the uplink channel bandwidth, $N_{RA}$ is the bandwidth of the random access resource, $t_{RA}$ is the time period of the random access resource, and $f_{RA}$ is the frequency index of the random access resource.

Optionally, that the processing unit 502 is configured to determine a frequency position of the random access resource based on the configuration information specifically includes:

when $\lfloor t_{RA}/T_{RA} \rfloor \bmod 2=0$ and $f_{RA} \bmod 2=0$,
$F_{RB}=f_{start}+N_{RA} \times \lfloor f_{RA}/2 \rfloor$;

when $\lfloor t_{RA}/T_{RA} \rfloor \bmod 2=0$ and $f_{RA} \bmod 2=1$,
$F_{RB}=N_{RB}-f_{start}-N_{RA} \times (\lfloor f_{RA}/2 \rfloor +1)$;

when $\lfloor t_{RA}/T_{RA} \rfloor \bmod 2=1$ and $f_{RA} \bmod 2=0$,
$F_{RB}=N_{RB}-f_{start}-N_{RA} \times (\lfloor f_{RA}/2 \rfloor +1)$; or when $\lfloor t_{RA}/T_{RA} \rfloor \bmod 2=1$ and $f_{RA} \bmod 2=1$,
$F_{RB}=f_{start}+N_{RA} \times \lfloor f_{RA}/2 \rfloor$, where $F_{RB}$ is the frequency position of the random access resource, $f_{start}$ is the initial frequency offset, $T_{RA}$ is the random access resource configuration period, $N_{RB}$ is the uplink channel bandwidth, $N_{RA}$ is the bandwidth of the random access resource, $t_{RA}$ is the time period of the random access resource, and $f_{RA}$ is the frequency index of the random access resource.

Optionally, that the processing unit 502 is configured to determine a frequency position of the random access resource based on the configuration information specifically includes:

when $\lfloor t_{RA}/T_{RA} \rfloor \bmod 2=0$, $F_{RB}=f_{start}+N_{RA} \times f_{RA}$; or when $\lfloor t_{RA}/T_{RA} \rfloor \bmod 2=1$, $F_{RB}=(f_{start}+f_{offset}+N_{RA} \times f_{RA}) \bmod N_{RB}$, where $F_{RB}$ is the frequency position of the random access resource, $f_{start}$ is the initial frequency offset, $T_{RA}$ is the random access resource configuration period, $N_{RB}$ is the uplink channel bandwidth, $N_{RA}$ is the bandwidth of the random access resource, $t_{RA}$ is the time period of the random access resource, $f_{RA}$ is the frequency index of the random access resource, and $f_{offset}$ is the frequency hopping offset.

Optionally, the configuration information further includes a mapping relationship between at least one actually sent downlink signal and a random access resource in a random access resource configuration pattern.

Optionally, the configuration information further includes a format of a random access preamble corresponding to the random access signal and/or at least one actually sent downlink signal.

Optionally, the configuration information further includes at least one of a system frame structure, uplink/downlink configuration information, and a duplex mode that are corresponding to the random access preamble.

The apparatus 5 may be a terminal device, or the apparatus 5 may be a field programmable gate array (FPGA), a dedicated integrated chip, a system on chip (SoC), a central processing unit (CPU), a network processor (NP), a digital signal processing circuit, or a micro control unit (MCU) that implements a related function, or may be a programmable logic device (PLD) or another integrated chip.

This embodiment of the present invention and the method embodiment in FIG. 2a are based on a same concept, and the technical effects brought by the two embodiments are also the same. For a specific process, refer to descriptions in the method embodiment in FIG. 2a. Details are not described herein again.

Figure 6:
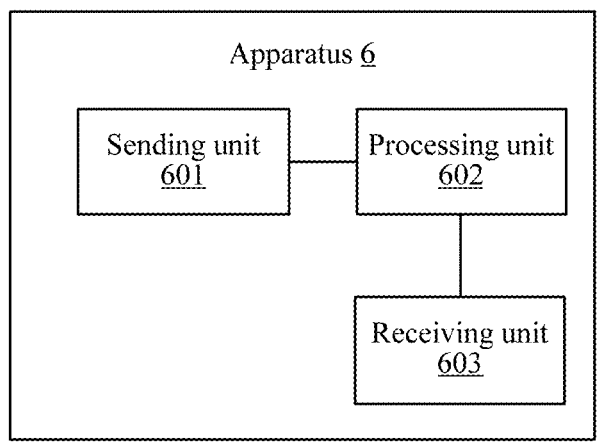
FIG. 6 is a schematic structural diagram of a random access signal receiving apparatus according to an embodiment of the present invention.

It should be noted that a random access signal receiving apparatus (hereinafter briefly referred to as an apparatus 6) shown in FIG. 6 can implement steps on a side of the network device in the embodiment shown in FIG. 2a. The apparatus 6 includes: a sending unit 601, configured to send configuration information to a terminal device, where the configuration information includes at least one of an initial frequency offset, a random access resource configuration period, an uplink channel bandwidth, a bandwidth of a random access resource, a time period of the random access resource, and a frequency index of the random access resource; a processing unit 602, configured to determine a frequency position of the random access resource based on the configuration information; and a receiving unit 603, configured to receive a random access signal from the terminal device at the frequency position of the random access resource.

Optionally, the configuration information further includes a frequency hopping offset.

Optionally, that the processing unit 602 is configured to determine a frequency position of the random access resource based on the configuration information specifically includes:

when $\lfloor t_{RA}/T_{RA} \rfloor \bmod 2=0$, $F_{RB}=f_{start}+N_{RA} \times f_{RA}$; or when $\lfloor t_{RA}/T_{RA} \rfloor \bmod 2=1$, $F_{RB}=N_{RB}-f_{start}-N_{RA} \times (f_{RA}+1)$, where $F_{RB}$ is the frequency position of the random access resource, $f_{start}$ is the initial frequency offset, $T_{RA}$ is the random access resource configuration period, $N_{RB}$ is the uplink channel bandwidth, $N_{RA}$ is the bandwidth of the random access resource, $t_{RA}$ is the time period of the random access resource, and $f_{RA}$ is the frequency index of the random access resource.

Optionally, that the processing unit 602 is configured to determine a frequency position of the random access resource based on the configuration information specifically includes:

when $\lfloor t_{RA}/T_{RA} \rfloor \bmod 2=0$ and $f_{RA} \bmod 2=0$,
$F_{RB}=f_{start}+N_{RA} \times \lfloor f_{RA}/2 \rfloor$;

when $\lfloor t_{RA}/T_{RA} \rfloor \bmod 2=0$ and $f_{RA} \bmod 2=1$,
$F_{RB}=N_{RB}-f_{start}-N_{RA} \times (\lfloor f_{RA}/2 \rfloor +1)$;

when $\lfloor t_{RA}/T_{RA} \rfloor \bmod 2=1$ and $f_{RA} \bmod 2=0$,
$F_{RB}=N_{RB}-f_{start}-N_{RA} \times (\lfloor f_{RA}/2 \rfloor +1)$; or when $\lfloor t_{RA}/T_{RA} \rfloor \bmod 2=1$ and $f_{RA} \bmod 2=1$,
$F_{RB}=f_{start}+N_{RA} \times \lfloor f_{RA}/2 \rfloor$, where $F_{RB}$ is the frequency position of the random access resource, $f_{start}$ is the initial frequency offset, $T_{RA}$ is the random access resource configuration period, $N_{RB}$ is the uplink channel bandwidth, $N_{RA}$ is the bandwidth of the random access resource, $t_{RA}$ is the time period of the random access resource, and $f_{RA}$ is the frequency index of the random access resource.

Optionally, that the processing unit 602 is configured to determine a frequency position of the random access resource based on the configuration information specifically includes:

when $\lfloor t_{RA}/T_{RA} \rfloor \bmod 2=0$, $F_{RB}=f_{start}+N_{RA} \times f_{RA}$; or when $\lfloor t_{RA}/T_{RA} \rfloor \bmod 2=1$, $F_{RB}=(f_{start}+f_{offset}+N_{RA} \times f_{RA}) \bmod N_{RB}$, where $F_{RB}$ is the frequency position of the random access resource, $f_{start}$ is the initial frequency offset, $T_{RA}$ is the random access resource configuration period, $N_{RB}$ is the uplink channel bandwidth, $N_{RA}$ is the bandwidth of the random access resource, $t_{RA}$ is the time period of the random access resource, and $f_{RA}$ is the frequency index of the random access resource, and $f_{offset}$ is the frequency hopping offset.

Optionally, the configuration information further includes a mapping relationship between at least one actually sent downlink signal and a random access resource in a random access resource configuration pattern.

Optionally, the configuration information further includes a format of a random access preamble corresponding to the random access signal and/or at least one actually sent downlink signal.

Optionally, the configuration information further includes at least one of a system frame structure, uplink/downlink configuration information, and a duplex mode that are corresponding to the random access preamble.

The apparatus 6 may be a network device, or the apparatus 6 may be a field programmable gate array (FPGA), a dedicated integrated chip, a system on chip (SoC), a central processing unit (CPU), a network processor (NP), a digital signal processing circuit, or a micro control unit (MCU) that implements a related function, or may be a programmable logic device (PLD) or another integrated chip.

This embodiment of the present invention and the method embodiment in FIG. 2*a* are based on a same concept, and the technical effects brought by the two embodiments are also the same. For a specific process, refer to descriptions in the method embodiment in FIG. 2*a*. Details are not described herein again.

The random access signal sending method in the embodiments of the present invention of FIG. 3*a* and FIG. 4 are described in detail, and a random access signal sending apparatus (hereinafter briefly referred to as an apparatus 7) according to an embodiment of the present invention is provided below.

Figure 7:
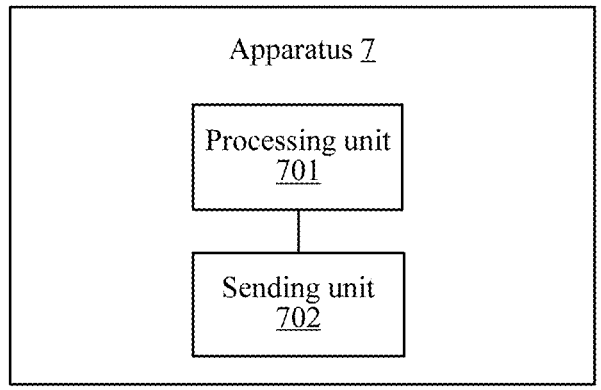
FIG. 7 is another schematic structural diagram of a random access signal sending apparatus according to an embodiment of the present invention.

It should be noted that the apparatus 7 shown in FIG. 7 can implement steps on a side of the terminal device in the embodiments shown in FIG. 3*a* and FIG. 4. The apparatus 7 includes a processing unit 701 and a sending unit 702. The processing unit 701 is configured to determine a frequency position of a random access resource based on a subcarrier offset and a resource block position of the random access resource. The sending unit 702 is configured to send a random access signal to a network device at the frequency position of the random access resource.

Optionally, that the processing unit 701 is configured to determine a frequency position of a random access resource based on a subcarrier offset and a resource block position of the random access resource specifically includes:

$F_{SC} = F_{RB} \times N_{SC}^{RB} + M$, where $F_{SC}$ is the frequency position of the random access resource, $F_{RB}$ is the resource block position of the random access resource, $N_{SC}^{RB}$ is a quantity of subcarriers in a resource block RB, and M is the subcarrier offset.

Optionally, the subcarrier offset is the same as an offset of at least one actually sent downlink signal; or the subcarrier offset is related to a frequency index and/or a carrier frequency of an initial random access resource in a random access resource configuration pattern corresponding to the random access resource; or indication information used to indicate the subcarrier offset is different from indication information used to indicate an offset of at least one actually sent downlink signal.

Optionally, the apparatus 7 further includes a receiving unit (not shown in the figure). The receiving unit is configured to receive configuration information from the network device, where the configuration information includes at least one of an initial frequency offset, a random access resource configuration period, an uplink channel bandwidth, a bandwidth of the random access resource, a time period of a random access resource, a time period of the random access resource, and a frequency index of the random access resource.

The processing unit is further configured to determine the resource block position of the random access resource based on the configuration information.

Also, the receiving unit is configured to receive the resource block position of the random access resource from the network device.

Optionally, the configuration information further includes a frequency hopping offset.

Optionally, that the processing unit 701 is configured to determine the resource block position of the random access resource based on the configuration information specifically includes:

when $\lfloor t_{RA}/T_{RA} \rfloor \bmod 2=0$, $F_{RB}=f_{start}+N_{RA} \times f_{RA}$; or when $\lfloor t_{RA}/T_{RA} \rfloor \bmod 2=1$, $F_{RB}=N_{RB}-f_{start}-N_{RA} \times (f_{RA}+1)$, where $F_{RB}$ is the resource block position of the random access resource, $f_{start}$ is the initial frequency offset, $T_{RA}$ is the random access resource configuration period, $N_{RB}$ is the uplink channel bandwidth, $N_{RA}$ is the bandwidth of the random access resource, $t_{RA}$ is the time period of the random access resource, and $f_{RA}$ is the frequency index of the random access resource.

Optionally, that the processing unit 701 is configured to determine the resource block position of the random access resource based on the configuration information specifically includes:

when $\lfloor t_{RA}/T_{RA} \rfloor \bmod 2=0$ and $f_{RA} \bmod 2=0$,
$F_{RB}=f_{start}+N_{RA} \times \lfloor f_{RA}/2 \rfloor$;

when $\lfloor t_{RA}/T_{RA} \rfloor \bmod 2=0$ and $f_{RA} \bmod 2=1$,
$F_{RB}=N_{RB}-f_{start}-N_{RA} \times (\lfloor f_{RA}/2 \rfloor +1)$;

when $\lfloor t_{RA}/T_{RA} \rfloor \bmod 2=1$ and $f_{RA} \bmod 2=0$,
$F_{RB}=N_{RB}-f_{start}-N_{RA} \times (\lfloor f_{RA}/2 \rfloor +1)$; or when $\lfloor t_{RA}/T_{RA} \rfloor \bmod 2=1$ and $f_{RA} \bmod 2=1$,
$F_{RB}=f_{start}+N_{RA} \times \lfloor f_{RA}/2 \rfloor$, where $F_{RB}$ is the resource block position of the random access resource, $f_{start}$ is the initial frequency offset, $T_{RA}$ is the random access resource configuration period, $N_{RB}$ is the uplink channel bandwidth, $N_{RA}$ is the bandwidth of the random access resource, $t_{RA}$ is the time period of the random access resource, and $f_{RA}$ is the frequency index of the random access resource.

Optionally, that the processing unit 701 is configured to determine the resource block position of the random access resource based on the configuration information specifically includes:

when $\lfloor t_{RA}/T_{RA} \rfloor \bmod 2=0$, $F_{RB}=f_{start}+N_{RA} \times f_{RA}$; or when $\lfloor t_{RA}/T_{RA} \rfloor \bmod 2=1$, $F_{RB}=(f_{start}+f_{offset}+N_{RA} \times f_{RA}) \bmod N_{RB}$, where $F_{RB}$ is the resource block position of the random access resource, $f_{start}$ is the initial frequency offset, $T_{RA}$ is the random access resource configuration period, $N_{RB}$ is the uplink channel bandwidth, $N_{RA}$ is the bandwidth of the random access resource, $t_{RA}$ is the time period of the random access resource, $f_{RA}$ is the frequency index of the random access resource, and $f_{offset}$ is the frequency hopping offset.

Optionally, the configuration information further includes a mapping relationship between at least one actually sent downlink signal and a random access resource in a random access resource configuration pattern.

Optionally, the configuration information further includes a format of a random access preamble corresponding to the random access signal and/or at least one actually sent downlink signal.

Optionally, the configuration information further includes at least one of a frame structure, uplink/downlink configuration information, and a duplex mode.

The apparatus 7 may be a terminal device, or the apparatus 7 may be a field programmable gate array (FPGA), a dedicated integrated chip, a system on chip (SoC), a central processing unit (CPU), a network processor (NP), a digital signal processing circuit, or a micro control unit (MCU) that implements a related function, or may be a programmable logic device (PLD) or another integrated chip.

This embodiment of the present invention and the method embodiments in FIG. 3a and FIG. 4 are based on a same concept, and the technical effects brought by these embodiments are also the same. For a specific process, refer to descriptions in the method embodiments in FIG. 3a and FIG. 4. Details are not described herein again.

Figure 8:
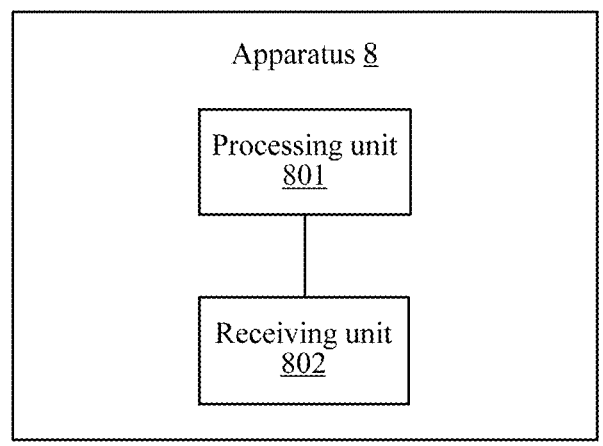
FIG. 8 is another schematic structural diagram of a random access signal receiving apparatus according to an embodiment of the present invention.

It should be noted that a random access signal receiving apparatus (hereinafter briefly referred to as an apparatus 8) shown in FIG. 8 can implement steps on a side of the network device in the embodiments shown in FIG. 3a and FIG. 4. The apparatus 8 includes: a processing unit 8i0 and a receiving unit 802. The processing unit 801 is configured to determine a frequency position of a random access resource based on a resource block position and a subcarrier offset of the random access resource. The receiving unit 802 is configured to receive a random access signal from a terminal device at the frequency position of the random access resource.

Optionally, that the processing unit 801 is configured to determine a frequency position of a random access resource based on a subcarrier offset and a resource block position of the random access resource specifically includes:

$F_{SC}=F_{RB} \times N_{SC}^{RB}+M$, where $F_{SC}$ is the frequency position of the random access resource, $F_{RB}$ is the resource block position of the random access resource, $N_{SC}^{RB}$ is a quantity of subcarriers in a resource block RB, and M is the subcarrier offset.

Optionally, the subcarrier offset is the same as an offset of a downlink signal; or the subcarrier offset is related to a frequency index and/or a carrier frequency of an initial random access resource in a random access resource configuration pattern corresponding to the random access resource; or indication information used to indicate the subcarrier offset is different from indication information used to indicate an offset of at least one actually sent downlink signal.

Optionally, the apparatus 8 further includes a sending unit (not shown in the figure). The sending unit is configured to send configuration information to the terminal device, where the configuration information includes at least one of an initial frequency offset, a random access resource configuration period, an uplink channel bandwidth, a bandwidth of the random access resource, a time period of a random access resource, a time period of the random access resource, and a frequency index of the random access resource.

Also, the processing unit 801 is further configured to determine the resource block position of the random access resource, where the configuration information includes at least one of an initial frequency offset, a random access resource configuration period, an uplink channel bandwidth, a bandwidth of the random access resource, a time period of a random access resource, a time period of the random access resource, and a frequency index of the random access resource.

The sending unit is configured to send the resource block position of the random access resource to the terminal device.

Optionally, the configuration information further includes a frequency hopping offset.

Optionally, that the processing unit 801 is configured to determine the resource block position of the random access resource based on the configuration information specifically includes:

when $\lfloor t_{RA}/T_{RA} \rfloor \mod 2=0$, $F_{RB}=f_{start}+N_{RA} \times f_{RA}$; or when $\lfloor t_{RA}/T_{RA} \rfloor \mod 2=1$, $F_{RB}=N_{RB}-f_{start}-N_{RA} \times (f_{RA}+1)$, where $F_{RB}$ is the resource block position of the random access resource, $f_{start}$ is the initial frequency offset, $T_{RA}$ is the random access resource configuration period, $N_{RB}$ is the uplink channel bandwidth, $N_{RA}$ is the bandwidth of the random access resource, $t_{RA}$ is the time period of the random access resource, and $f_{RA}$ is the frequency index of the random access resource.

Optionally, that the processing unit 801 is configured to determine the resource block position of the random access resource based on the configuration information specifically includes:

when $\lfloor t_{RA}/T_{RA} \rfloor \mod 2=0$ and $f_{RA} \mod 2=0$,
$F_{RB}=f_{start}+N_{RA} \times \lfloor f_{RA}/2 \rfloor$;

when $\lfloor t_{RA}/T_{RA} \rfloor \mod 2=0$ and $f_{RA} \mod 2=1$,
$F_{RB}=N_{RB}-f_{start}-N_{RA} \times (\lfloor f_{RA}/2 \rfloor+1)$;

when $\lfloor t_{RA}/T_{RA} \rfloor \mod 2=1$ and $f_{RA} \mod 2=0$,
$F_{RB}=N_{RB}-f_{start}-N_{RA} \times (\lfloor f_{RA}/2 \rfloor+1)$; or when $\lfloor t_{RA}/T_{RA} \rfloor \mod 2=1$ and $f_{RA} \mod 2=1$,
$F_{RB}=f_{start}+N_{RA} \times \lfloor f_{RA}/2 \rfloor$, where $F_{RB}$ is the resource block position of the random access resource, $f_{start}$ is the initial frequency offset, $T_{RA}$ is the random access resource configuration period, $N_{RB}$ is the uplink channel bandwidth, $N_{RA}$ is the bandwidth of the random access resource, $t_{RA}$ is the time period of the random access resource, and $f_{RA}$ is the frequency index of the random access resource.

Optionally, that the processing unit 801 is configured to determine the resource block position of the random access resource based on the configuration information specifically includes:

when $\lfloor t_{RA}/T_{RA} \rfloor \mod 2=0$, $F_{RB}=f_{start}+N_{RA} \times f_{RA}$; or when $\lfloor t_{RA}/T_{RA} \rfloor \mod 2=1$, $F_{RB}=(f_{start}+f_{offset}+N_{RA} \times f_{RA}) \mod N_{RB}$, where $F_{RB}$ is the resource block position of the random access resource, $f_{start}$ is the initial frequency offset, $T_{RA}$ is the random access resource configuration period, $N_{RB}$ is the uplink channel bandwidth, $N_{RA}$ is the bandwidth of the random access resource, $t_{RA}$ is the time period of the random access resource, $f_{RA}$ is the frequency index of the random access resource, and $f_{offset}$ is the frequency hopping offset.

Optionally, the configuration information further includes a mapping relationship between at least one actually sent downlink signal and a random access resource in a random access resource configuration pattern.

Optionally, the configuration information further includes a format of a random access preamble corresponding to the random access signal and/or at least one actually sent downlink signal.

Optionally, the configuration information further includes at least one of a frame structure, uplink/downlink configuration information, and a duplex mode.

The apparatus 8 may be a network device, or the apparatus 8 may be a field programmable gate array (FPGA), a dedicated integrated chip, a system on chip (SoC), a central processing unit (CPU), a network processor (NP), a digital signal processing circuit, or a micro control unit (MCU) that implements a related function, or may be a programmable logic device (PLD) or another integrated chip.

This embodiment of the present invention and the method embodiments in FIG. 3a and FIG. 4 are based on a same concept, and the technical effects brought by these embodiments are also the same. For a specific process, refer to descriptions in the method embodiments in FIG. 3a and FIG. 4. Details are not described herein again.

Figure 9:
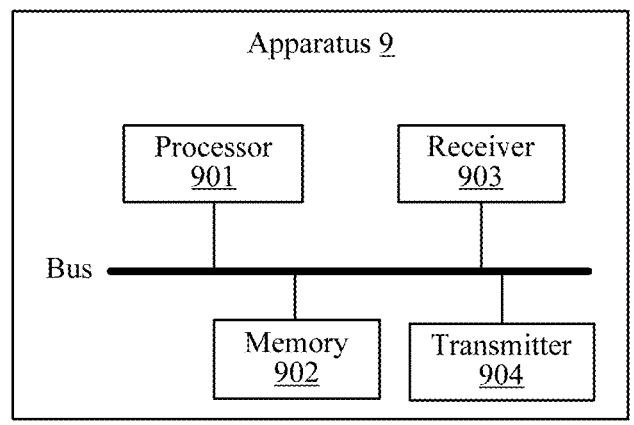
FIG. 9 is a schematic structural diagram of an apparatus according to an embodiment of the present invention.

FIG. 9 is a schematic structural diagram of an apparatus according to an embodiment of the present invention. Hereinafter the apparatus is briefly referred to as an apparatus 9. The apparatus 9 may be integrated into the foregoing network device or terminal device. As shown in FIG. 9, the apparatus includes a memory 902, a processor 901, a transmitter 904, and a receiver 903.

The memory 902 may be an independent physical unit, and may be connected to the processor 901, the transmitter 904, and the receiver 903 through a bus. Also, the memory 902, the processor 901, the transmitter 904, and the receiver 903 may be integrated together, and are implemented through hardware and the like.

The transmitter 904 and the receiver 903 may further be connected to an antenna. The receiver 903 receives, through the antenna, information sent by another device. Correspondingly, the transmitter 904 sends information to another device through the antenna.

The memory 902 is configured to store a program for implementing the foregoing method embodiments or various units in the apparatus embodiments. The processor 901 invokes the program, to perform an operation in the foregoing method embodiments.

Optionally, when a part or all of a random access method in the foregoing embodiments is implemented through software, a random access apparatus may also include only a processor. A memory configured to store a program is located outside the random access apparatus, and the processor is connected to the memory through a circuit/a cable, and is configured to read and execute the program stored in the memory.

The processor may be a central processing unit (CPU), a network processor (NP), or a combination of a CPU and an NP.

The processor may further include a hardware chip. The hardware chip may be an application-specific integrated circuit (ASIC), a programmable logic device (PLD), or a combination thereof. The PLD may be a complex programmable logic device (CPLD), a field programmable gate array (FPGA), a generic array logic (GAL), or any combination thereof.

The memory may include a volatile memory (volatile memory), for example, a random access memory (RAM). The memory may also include a non-volatile memory (non-volatile memory), for example, a flash memory (flash memory), a hard disk drive (HDD), or a solid-state drive (SSD). The memory may further include a combination of the foregoing types of memories.

In the foregoing embodiments, the sending unit or the transmitter performs sending steps in the foregoing method embodiments, the receiving unit or the receiver performs receiving steps in the foregoing method embodiments, and other steps are performed by another unit or the processor. The sending unit and the receiving unit may constitute a transceiver unit, and the receiver and the transmitter may constitute a transceiver.

An embodiment of this application further provides a computer-readable storage medium, storing a computer program, where the computer program is used to perform the random access method provided in the foregoing embodiments.

An embodiment of this application further provides a computer program product including an instruction. When the computer program product is run on a computer, the computer is enabled to perform the random access method provided in the foregoing embodiments.

A person skilled in the art should understand that the embodiments of this application may be provided as a method, a system, or a computer program product. Therefore, this application may use a form of hardware only embodiments, software only embodiments, or embodiments with a combination of software and hardware. Moreover, this application may use a form of a computer program product that is implemented on one or more computer-usable storage media (including but not limited to a disk memory, a CD-ROM, an optical memory, and the like) that include computer usable program code.

This application is described with reference to the flowcharts and/or block diagrams of the method, the device (system), and the computer program product according to the embodiments of this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may be loaded onto a computer or another programmable data processing device, so that a series of operations and steps are performed on the computer or the another programmable device, thereby generating computer-implemented processing. Therefore, the instructions executed on the computer or the another programmable device provide steps for implement-

53 ing a specific function in one or more processes in the flowcharts and/or in one or more blocks in the block diagrams.

What is claimed is:

1. A method, comprising:
generating a random access signal; and
sending the random access signal to a network device, wherein the random access signal satisfies the following formula:

$$s(t) = \beta_{PRACH} \sum_{k=0}^{N_{ZC}-1} \sum_{n=0}^{N_{ZC}-1} x_{u,v}(n) \cdot e^{-j\frac{2\pi nk}{N_{ZC}}} \cdot e^{j2\pi(k+\varphi+Kk_0)\Delta f_{RA}(t-T_{CP})},$$

wherein s(t) is the random access signal; $\beta_{PRACH}$ is an amplitude adjustment factor of the random access signal, and is usable for controlling transmit power of the random access signal; $N_{ZC}$ is a sequence length of a random access preamble corresponding to the random access signal; $x_{u,v}(n)$ is a Zadoff-Chu (ZC) sequence for generating the random access preamble; $T_{CP}$ is a time length of a cyclic prefix; $\Delta f_{RA}$ is a subcarrier spacing of the random access preamble; $K=\Delta f/\Delta f_{RA}$; $\Delta f$ is a subcarrier spacing of an uplink bandwidth part during initial access or an uplink bandwidth part (BWP) for access; $Kk_0+ \underline{\varphi}$ is a frequency position of a starting subcarrier of the random access preamble; t is a time position of the random access signal; $0 \leq t < T_{SEQ}+T_{CP}$; $T_{SEQ}$ is a time length of the sequence length; and wherein: a format of the random access preamble is a format 3, the subcarrier spacing of the random access preamble is 5 kHz, and a value of $\varphi$ is 12; or a format of the random access preamble is one of A1, A2, A3, B1, B2, B3, B4, C0, or C2, the subcarrier spacing of the random access preamble is one of 15 kHz, 30 kHz, 60 kHz, or 120 kHz, and a value of $\varphi$ is 2.

2. The method according to claim 1, wherein sending the random access signal to the receiver comprises:
determining a frequency position of a random access resource based on a subcarrier offset and a resource block position of the random access resource; and
sending the random access signal to the network device at the frequency position of the random access resource.

3. The method according to claim 2, wherein determining the frequency position of the random access resource based on the subcarrier offset and the resource block position of the random access resource comprises:
determining the frequency position of the random access resource that satisfies the following formula:
$F_{SC}=F_{RB} \times N_{SC}^{RB}+M$, wherein $F_{SC}$ is the frequency position of the random access resource, $F_{RB}$ is the resource block position of the random access resource, $N_{SC}^{RB}$ is a quantity of subcarriers in a resource block (RB), and M is the subcarrier offset.

4. An apparatus, comprising:
a processor, configured to generate a random access signal; and
a sender, configured to send the random access signal to a network device, wherein the random access signal satisfies the following formula:

$$s(t) = \beta_{PRACH} \sum_{k=0}^{N_{ZC}-1} \sum_{n=0}^{N_{ZC}-1} x_{u,v}(n) \cdot e^{-j\frac{2\pi nk}{N_{ZC}}} \cdot e^{j2\pi(k+\varphi+Kk_0)\Delta f_{RA}(t-T_{CP})},$$

54 wherein s(t) is the random access signal; $\beta_{PRACH}$ is an amplitude adjustment factor of the random access signal, and is usable for controlling transmit power of the random access signal; $N_{ZC}$ is a sequence length of a random access preamble corresponding to the random access signal; $x_{u,v}(n)$ is a Zadoff-Chu (ZC) sequence for generating the random access preamble; $T_{CP}$ is a time length of a cyclic prefix; $\Delta f_{RA}$ is a subcarrier spacing of the random access preamble; $K=\Delta f/\Delta f_{RA}$; $\Delta f$ is a subcarrier spacing of an uplink bandwidth part during initial access or an uplink bandwidth part (BWP) for access; $Kk_0+ \underline{\varphi}$ is a frequency position of a starting subcarrier of the random access preamble; t is a time position of the random access signal; $0 \leq t < T_{SEQ}+T_{CP}$; $T_{SEQ}$ is a time length of the sequence length; and wherein a format of the random access preamble is a format 3, the subcarrier spacing of the random access preamble is 5 kHz, and a value of $\varphi$ is 12; or a format of the random access preamble is one of A1, A2, A3, B1, B2, B3, B4, C0, or C2, the subcarrier spacing of the random access preamble is one of 15 kHz, 30 kHz, 60 kHz, or 120 kHz, and a value of $\varphi$ is 2.

5. The apparatus according to claim 4, wherein sending the random access signal to the receiver comprises:
determining a frequency position of a random access resource based on a subcarrier offset and a resource block position of the random access resource; and
sending the random access signal to the network device at the frequency position of the random access resource.

6. The apparatus according to claim 5, wherein determining the frequency position of the random access resource based on the subcarrier offset and the resource block position of the random access resource comprises:
determining the frequency position of the random access resource that satisfies the following formula:
$F_{SC}=F_{RB} \times N_{SC}^{RB}+M$, wherein $F_{SC}$ is the frequency position of the random access resource, $F_{RB}$ is the resource block position of the random access resource, $N_{SC}^{RB}$ is a quantity of subcarriers in a resource block (RB), and M is the subcarrier offset.

7. An apparatus, comprising:
a receiver, configured to receive a random access signal; and
a processor, configured to respond to the random access signal, wherein the random access signal satisfies the following formula:

$$s(t) = \beta_{PRACH} \sum_{k=0}^{N_{ZC}-1} \sum_{n=0}^{N_{ZC}-1} x_{u,v}(n) \cdot e^{-j\frac{2\pi nk}{N_{ZC}}} \cdot e^{j2\pi(k+\varphi+Kk_0)\Delta f_{RA}(t-T_{CP})},$$

wherein s(t) is the random access signal; $\beta_{PRACH}$ is an amplitude adjustment factor of the random access signal, and is usable for controlling transmit power of the random access signal; $N_{ZC}$ is a sequence length of a random access preamble corresponding to the random access signal; $x_{u,v}(n)$ is a Zadoff-Chu (ZC) sequence usable for generating the random access preamble; $T_{CP}$ is a time length of a cyclic prefix; $\Delta f_{RA}$ is a subcarrier spacing of the random access preamble; $K=\Delta f/\Delta f_{RA}$; $\Delta f$ is a subcarrier spacing of an uplink bandwidth part during initial access or an uplink bandwidth part (BWP) for access; $Kk_0+ \underline{\varphi}$ is a frequency position of a starting subcarrier of the random access preamble; t is a time position of the random access signal; $0 \leq t < T_{SEQ}+$ $T_{CP}$; $T_{SEQ}$ is a time length of the sequence length; and wherein a format of the random access preamble is a format 3, the subcarrier spacing of the random access preamble is 5 kHz, and a value of φ is 12; or a format of the random access preamble is one of A1, A2, A3, B1, B2, B3, B4, C0, or C2, the subcarrier spacing of the random access preamble is one of 15 kHz, 30 kHz, 60 kHz, or 120 kHz, and a value of φ is 2.

8. The apparatus according to claim 7, wherein receiving the random access signal comprises:
   determining a frequency position of a random access resource based on a subcarrier offset and a resource block position of the random access resource; and
   receiving the random access signal from a terminal device at the frequency position of the random access resource.

9. The apparatus according to claim 8, wherein the frequency position of the random access resource satisfies the following formula:
   $F_{SC}=F_{RB} \times N_{SC}^{RB}+M$, wherein $F_{SC}$ is the frequency position of the random access resource, $F_{RB}$ is the resource block position of the random access resource, $N_{SC}^{RB}$ is a quantity of subcarriers in a resource block (RB), and M is the subcarrier offset.

10. A method, comprising:
    receiving a random access signal; and
    responding to the random access signal, wherein the random access signal satisfies the following formula:

$$s(t) = \beta_{PRACH} \sum_{k=0}^{N_{ZC}-1} \sum_{n=0}^{N_{ZC}-1} x_{u,v}(n) \cdot e^{-j\frac{2\pi nk}{N_{ZC}}} \cdot e^{j2\pi(k+\varphi+Kk_0)\Delta f_{RA}(t-T_{CP})},$$

wherein s(t) is the random access signal; $\beta_{PRACH}$ is an amplitude adjustment factor of the random access signal, and is usable for controlling transmit power of the random access signal; $N_{ZC}$ is a sequence length of a random access preamble corresponding to the random access signal; $x_{u,v}(n)$ is a Zadoff-Chu (ZC) sequence usable for generating the random access preamble; $T_{CP}$ is a time length of a cyclic prefix; $\Delta f_{RA}$ is a subcarrier spacing of the random access preamble; $K=\Delta f/\Delta f_{RA}$; $\Delta f$ is a subcarrier spacing of an uplink bandwidth part during initial access or an uplink bandwidth part (BWP) for access; $Kk_o+ \underline{\varphi}$ is a frequency position of a starting subcarrier of the random access preamble; t is a time position of the random access signal; $0 \le t < T_{SEQ}+T_{CP}$; $T_{SEQ}$ is a time length of the sequence length; and wherein a format of the random access preamble is a format 3, the subcarrier spacing of the random access preamble is 5 kHz, and a value of φ is 12; or a format of the random access preamble is one of A1, A2, A3, B1, B2, B3, B4, C0, or C2, the subcarrier spacing of the random access preamble is one of 15 kHz, 30 kHz, 60 kHz, or 120 kHz, and a value of φ is 2.

11. The method according to claim 10, wherein receiving the random access signal comprises:
    determining a frequency position of a random access resource based on a subcarrier offset and a resource block position of the random access resource; and
    receive the random access signal from a terminal device at the frequency position of the random access resource.

12. The method according to claim 11, wherein the frequency position of the random access resource satisfies the following formula:
    $F_{SC}=F_{RB} \times N_{SC}^{RB}+M$, wherein $F_{SC}$ is the frequency position of the random access resource, $F_{RB}$ is the resource block position of the random access resource, $N_{SC}^{RB}$ is a quantity of subcarriers in a resource block (RB), and M is the subcarrier offset.

13. A non-transitory memory storage medium comprising computer-executable instructions that, when executed, facilitate an apparatus carrying out operations comprising:
    generating a random access signal; and
    sending the random access signal to a network device, wherein the random access signal satisfies the following formula:

$$s(t) = \beta_{PRACH} \sum_{k=0}^{N_{ZC}-1} \sum_{n=0}^{N_{ZC}-1} x_{u,v}(n) \cdot e^{-j\frac{2\pi nk}{N_{ZC}}} \cdot e^{j2\pi(k+\varphi+Kk_0)\Delta f_{RA}(t-T_{CP})},$$

wherein s(t) is the random access signal; $\beta_{PRACH}$ is an amplitude adjustment factor of the random access signal, and is usable for controlling transmit power of the random access signal; $N_{ZC}$ is a sequence length of a random access preamble corresponding to the random access signal; $x_{u,v}(n)$ is a Zadoff-Chu (ZC) sequence for generating the random access preamble; $T_{CP}$ is a time length of a cyclic prefix; $\Delta f_{RA}$ is a subcarrier spacing of the random access preamble; $K=\Delta f/\Delta f_{RA}$; $\Delta f$ is a subcarrier spacing of an uplink bandwidth part during initial access or an uplink bandwidth part (BWP) for access; $Kk_o+ \underline{\varphi}$ is a frequency position of a starting subcarrier of the random access preamble; t is a time position of the random access signal; $0 \le t < T_{SEQ}+T_{CP}$; $T_{SEQ}$ is a time length of the sequence length; and wherein a format of the random access preamble is a format 3, the subcarrier spacing of the random access preamble is 5 kHz, and a value of φ is 12; or a format of the random access preamble is one of A1, A2, A3, B1, B2, B3, B4, C0, or C2, the subcarrier spacing of the random access preamble is one of 15 kHz, 30 kHz, 60 kHz, or 120 kHz, and a value of φ is 2.

14. The non-transitory memory storage medium according to claim 13, wherein the sending the random access signal to a network device comprises:
    determining a frequency position of a random access resource based on a subcarrier offset and a resource block position of the random access resource; and
    sending the random access signal to the network device at the frequency position of the random access resource.

15. The non-transitory memory storage medium according to claim 14, wherein determining the frequency position of the random access resource based on the subcarrier offset and the resource block position of the random access resource comprises:
    determining the frequency position of the random access resource that satisfies the following formula:
    $F_{SC}=F_{RB} \times N_{SC}^{RB}+M$, wherein $F_{SC}$ is the frequency position of the random access resource, $F_{RB}$ is the resource block position of the random access resource, $N_{SC}^{RB}$ is a quantity of subcarriers in a resource block (RB), and M is the subcarrier offset.

16. A non-transitory memory storage medium comprising computer-executable instructions that, when executed, facilitate an apparatus carrying out operations comprising:

receiving a random access signal; and
responding to the random access signal, wherein the random access signal satisfies the following formula:

$$s(t) = \beta_{PRACH} \sum_{k=0}^{N_{ZC}-1} \sum_{n=0}^{N_{ZC}-1} x_{u,v}(n) \cdot e^{-j\frac{2\pi nk}{N_{ZC}}} \cdot e^{j2\pi(k+\varphi+Kk_0)\Delta f_{RA}(t-T_{CP})},$$

wherein s(t) is the random access signal; $\beta_{PRACH}$ is an amplitude adjustment factor of the random access signal, and is usable for controlling transmit power of the random access signal; $N_{ZC}$ is a sequence length of a random access preamble corresponding to the random access signal; $x_{u,v}(n)$ is a Zadoff-Chu (ZC) sequence for generating the random access preamble; $T_{CP}$ is a time length of a cyclic prefix; $\Delta f_{RA}$ is a subcarrier spacing of the random access preamble; $K=\Delta f/\Delta f_{RA}$; $\Delta f$ is a subcarrier spacing of an uplink bandwidth part during initial access or an uplink bandwidth part (BWP) for access; $Kk_0+\varphi$ is a frequency position of a starting subcarrier of the random access preamble; t is a time position of the random access signal; $0 \leq t < T_{SEQ}+T_{CP}$; $T_{SEQ}$ is a time length of the sequence length; and wherein a format of the random access preamble is a format 3, the subcarrier spacing of the random access preamble is 5 kHz, and a value of φ is 12; or a format of the random access preamble is one of A1, A2, A3, B1, B2, B3, B4, C0, or C2, the subcarrier spacing of the random access preamble is one of 15 kHz, 30 kHz, 60 kHz, or 120 kHz, and a value of φ is 2.

17. The non-transitory memory storage medium according to claim 16, wherein receiving the random access signal comprises:
   determining a frequency position of a random access resource based on a subcarrier offset and a resource block position of the random access resource; and
   receive the random access signal from a terminal device at the frequency position of the random access resource.

18. A system, comprising:
a transmitter; and
a receiver;
wherein the transmitter is configured to perform the following:
   sending a random access signal to the receiver, wherein the random access signal satisfies the following formula:

$$s(t) = \beta_{PRACH} \sum_{k=0}^{N_{ZC}-1} \sum_{n=0}^{N_{ZC}-1} x_{u,v}(n) \cdot e^{-j\frac{2\pi nk}{N_{ZC}}} \cdot e^{j2\pi(k+\varphi+Kk_0)\Delta f_{RA}(t-T_{CP})},$$

wherein s(t) is the random access signal; $\beta_{PRACH}$ is an amplitude adjustment factor of the random access signal, and is usable for controlling transmit power of the random access signal; $N_{ZC}$ is a sequence length of a random access preamble corresponding to the random access signal; $x_{u,v}(n)$ is a Zadoff-Chu (ZC) sequence for generating the random access preamble; $T_{CP}$ is a time length of a cyclic prefix; $\Delta f_{RA}$ is a subcarrier spacing of the random access preamble; $K=\Delta f/\Delta f_{RA}$; $\Delta f$ is a subcarrier spacing of an uplink bandwidth part during initial access or an uplink bandwidth part (BWP) for access; $Kk_0+\varphi$ is a frequency position of a starting subcarrier of the random access preamble; t is a time position of the random access signal; $0 \leq t < T_{SEQ}+T_{CP}$; $T_{SEQ}$ is a time length of the sequence length; and wherein a format of the random access preamble is a format 3, the subcarrier spacing of the random access preamble is 5 kHz, and a value of φ is 12; or a format of the random access preamble is one of A1, A2, A3, B1, B2, B3, B4, C0, or C2, the subcarrier spacing of the random access preamble is one of 15 kHz, 30 kHz, 60 kHz, or 120 kHz, and a value of φ is 2; and
   wherein the receiver is configured to receive the random access signal.

19. The system according to claim 18, wherein sending the random access signal to the receiver comprises:
   determining a frequency position of a random access resource based on a subcarrier offset and a resource block position of the random access resource; and
   sending the random access signal to the network device at the frequency position of the random access resource.

20. The system according to claim 19, wherein determining the frequency position of the random access resource based on the subcarrier offset and a resource block position of the random access resource comprises:
   determining the frequency position of the random access resource satisfies the following formula:
   $F_{SC}=F_{RB} \times N_{SC}^{RB}+M$, wherein $F_{SC}$ is the frequency position of the random access resource, $F_{RB}$ is the resource block position of the random access resource, $N_{SC}^{RB}$ is a quantity of subcarriers in a resource block (RB), and M is the subcarrier offset.

\* \* \* \* \*

UNITED STATES PATENT AND TRADEMARK OFFICE
CERTIFICATE OF CORRECTION

| | |
|---|---|
| PATENT NO. | : 11,582,806 B2 |
| APPLICATION NO. | : 16/875717 |
| DATED | : February 14, 2023 |
| INVENTOR(S) | : Yan et al. |

It is certified that error appears in the above-identified patent and that said Letters Patent is hereby corrected as shown below:

In the Specification

In the Detailed Description of Illustrative Embodiments, Column 49, Line 32; delete "8$i$0" and insert --801--.

Signed and Sealed this
Twenty-first Day of March, 2023

Katherine Kelly Vidal
*Director of the United States Patent and Trademark Office*